(12) United States Patent
Iwanaga

(10) Patent No.: US 7,661,826 B2
(45) Date of Patent: Feb. 16, 2010

(54) DISTANCE-MEASURING APPARATUS

(75) Inventor: Masakuni Iwanaga, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 590 days.

(21) Appl. No.: 11/524,491

(22) Filed: Sep. 20, 2006

(65) Prior Publication Data

US 2007/0071430 A1  Mar. 29, 2007

(30) Foreign Application Priority Data

Sep. 27, 2005 (JP) ............................ 2005-279454

(51) Int. Cl.
*G03B 21/14* (2006.01)
(52) U.S. Cl. .......................... 353/69; 353/70
(58) Field of Classification Search .................. 353/69, 353/70, 101
See application file for complete search history.

(56) References Cited

U.S. PATENT DOCUMENTS

| | | | | |
|---|---|---|---|---|
| 6,047,136 | A * | 4/2000 | Nakamura | 396/128 |
| 6,476,943 | B1 * | 11/2002 | Yertoprakhov | 359/15 |
| 7,092,045 | B2 * | 8/2006 | Haruna et al. | 348/745 |
| 7,252,388 | B2 * | 8/2007 | Ogawa | 353/70 |
| 2003/0193653 | A1 * | 10/2003 | Belliveau | 353/31 |
| 2004/0065853 | A1 * | 4/2004 | McQueen | 250/568 |
| 2005/0237492 | A1 * | 10/2005 | Shinozaki | 353/69 |
| 2006/0197921 | A1 * | 9/2006 | Kurosu et al. | 353/70 |
| 2006/0238773 | A1 * | 10/2006 | Wellstead et al. | 356/510 |
| 2006/0256299 | A1 * | 11/2006 | Saito | 353/70 |
| 2007/0071431 | A1 * | 3/2007 | Inoue et al. | 396/116 |

FOREIGN PATENT DOCUMENTS

| | | |
|---|---|---|
| JP | 02-222806 A | 9/1990 |
| JP | 03-282392 A | 12/1991 |
| JP | 08-005342 A | 1/1996 |
| JP | 08-178648 A | 7/1996 |
| JP | 2003-207580 A | 7/2003 |
| JP | 2005-006228 A | 1/2005 |
| JP | 2005-061925 A | 3/2005 |
| JP | 2005-147959 A | 6/2005 |
| JP | 2005-227194 A | 8/2005 |

(Continued)

OTHER PUBLICATIONS

A Japanese Office Action (and English translation thereof) dated May 7, 2008, issued in a counterpart Japanese Application in related co-pending U.S. Appl. No. 11/521,191.

(Continued)

*Primary Examiner*—William C Dowling
(74) *Attorney, Agent, or Firm*—Frishauf, Holtz, Goodman & Chick, P.C.

(57) ABSTRACT

A driving mechanism drives a phase difference sensor including a pair of photodetectors arranged in line in a direction (sensor arrangement direction) perpendicular to the direction of arrangement of the photodetectors. The distance to a target object is measured in the sensor arrangement direction while the phase difference sensor is set in a given position. The distance to the target object is measured in a direction perpendicular to the sensor arrangement direction by moving the phase difference sensor through the driving mechanism.

6 Claims, 16 Drawing Sheets

FOREIGN PATENT DOCUMENTS

JP 2005-307934 A 11/2005

OTHER PUBLICATIONS

Abramowitz et al. Right-Angle Prisms, http://web.archive.org/web/20020813184942/http://www.micro.magnet.fsu.edu/primer/java/prismsandbeamsplitters/rightangleprisms/index.html, 2002.

Precision Beam Splitters, http://web.archive.org/web/20050310131147/http://lightmachinery.com/precision-beam-splitters.html, 2005, LightMachinery.

Module 6: Laser Distance Measurement, http://web.archive.org/web/20010223134555/http://cord.org/cm/leot/Module6/module6.htm, 2001, Cord.

\* cited by examiner

DISTANCE-MEASURING APPARATUS

CROSS-REFERENCE TO RELATED APPLICATIONS

This application is based upon and claims the benefit of priority from prior Japanese Patent Application No. 2005-279454, filed Sep. 27, 2005, the entire contents of which are incorporated herein by reference.

BACKGROUND OF THE INVENTION

1. Field of the Invention

The present invention relates to a distance-measuring apparatus for measuring the distance to a target object using a phase difference sensor, a projecting apparatus using the distance-measuring apparatus, an imaging apparatus using the distance-measuring apparatus, and a distance-measuring method.

2. Description of the Related Art

When a projecting apparatus (projector) projects an image on a screen, the image might be distorted like a trapezoid depending on how the projector is disposed with respect to the screen.

As a method of correcting the distortion of a projected image automatically, the following is performed. The distance from a projection optical system to a screen is measured at three or more points. On the basis of a phase difference among the distances to the three points, the inclination angle of the projection plane of the screen is detected, and the distortion of an image projected on the plane is corrected (see Jpn. Pat. Appln. KOKAI Publication No. 2005-006228, for example).

Measuring the distance to a target object is called "distance measurement." Correcting the distortion of a projected image on the basis of the result of the distance measurement is called "trapezoid correction" because the image is distorted like a trapezoid.

A projector usually includes two phase difference sensors 1 and 2 as illustrated in FIG. 19. The phase difference sensor 1 detects the inclination of a projected image in the horizontal direction, while the phase difference sensor 2 detects the inclination of a projected image in the vertical direction. The phase difference sensor 1 is so provided that its sensor components are arranged in the horizontal direction and the phase difference sensor 2 is so provided that its sensor components are arranged in the vertical direction. In FIG. 19, reference numeral 3 denotes a projector lens of the projector and reference numeral 4 denotes a display element.

With the two phase difference sensors 1 and 2, the distance in the horizontal direction can be measured at a plurality of points, as can be the distance in the vertical direction. The distortion of a projected image can thus be corrected exactly on the basis of distance data of these points.

However, the use of two phase difference sensors causes a problem of a decrease in measurement precision due to a change in the shape of the sensors as well as a problem of an increase in cost. The phase difference sensors are sometimes influenced by ambient temperature, heat of a light source, etc. and changed in shape with time. Though the change in shape is very small, the sensors have a great influence on measurement precision because the size of the sensors themselves is small.

In particular, both ends of each phase difference sensor are changed in shape and thus the precision of so-called "multi-point distance measurement" using both the ends remarkably lowers. Due to a difference in the change in shape between the two phase difference sensors, the measurement precision in the horizontal and vertical directions becomes uneven and thus the distortion of an image cannot be corrected precisely.

A technique of reducing an error in measurement using a phase difference sensor in a prior art projector is disclosed in Jpn. Pat. Appln. KOKAI Publication No. 2005-061925. The Publication discloses that a chart image (pattern image for distance measurement) is shifted a plurality of times and projected to measure the distance to a target object and the results of a plurality of measurements are averaged. However, the technique is a method of reducing an error by a plurality of measurements, and cannot cancel an error in measurement due to a change in the shape of the phase difference sensors and a difference between the sensors.

Jpn. Pat. Appln. KOKAI Publication No. 2005-307934 discloses a camera using phase difference sensors. The camera has a function of detecting an external factor in inhibiting measurement and a function of promoting the necessity of remeasurement. If an image is picked up with the phase difference sensors covered with an operator's finger, a warning is given to the operator. However, this warning shows only the incapability of measurement. As in the case of Publication No. 2005-061925, Publication No. 2005-307934 cannot cancel an error in measurement due to a change in the shape of the phase difference sensors and a difference between the sensors.

As described above, conventionally, the multi-point distance measurement has been achieved using two phase difference sensors. However, the use of two phase difference sensors causes the problems that the cost of the components of the sensors is increased and the measurement precision due to a difference in shape between the sensors is decreased.

BRIEF SUMMARY OF THE INVENTION

The present invention has been developed in consideration of the above situation and its object is to provide a distance-measuring apparatus and a distance-measuring method both capable of multi-point distance measurement for measuring the distance to a target object using a single phase difference sensor to thereby reduce an error in measurement due to a change in the shape of the sensor and increase the measurement precision.

According to a first aspect of the present invention, there is provided a distance-measuring apparatus comprising:

a phase difference sensor including a pair of light-receiving components arranged in line;

a driving mechanism which supports the phase difference sensor such that the light-receiving components face a target object, and moves the phase difference sensor in a direction perpendicular to a direction of arrangement of the light-receiving components; and a distance-measuring unit which measures a distance to the target object in the direction of arrangement of the light-receiving components while the phase difference sensor is set in a given position and which moves the phase difference sensor through the driving mechanism to measure a distance to the target object in the direction perpendicular to a direction of arrangement of the light-receiving components.

According to a second aspect of the present invention, there is provided a distance-measuring apparatus comprising:

a phase difference sensor including a pair of light-receiving components arranged in line;

an optical member provided on a front of the phase difference sensor;

a driving mechanism which supports the optical member such that the optical member faces a target object, and moves the optical member to change a direction of measurement of the phase difference sensor to a direction perpendicular to a direction of arrangement of the light-receiving components; and a distance-measuring unit which measures a distance to the target object in the direction of arrangement of the light-receiving components while the optical member is set in a given position and which moves the optical member through the driving mechanism to measure a distance to the target object in the direction perpendicular to the direction of arrangement of the light-receiving components.

According to a third aspect of the present invention, there is provided a n projecting apparatus comprising:

a distance-measuring apparatus including:
a phase difference sensor including a pair of light-receiving components arranged in line;
a driving mechanism which supports the phase difference sensor such that the light-receiving components face a target object, and moves the phase difference sensor in a direction perpendicular to a direction of arrangement of the light-receiving components; and
a distance-measuring unit which measures a distance to the target object in the direction of arrangement of the light-receiving components while the phase difference sensor is set in a given position and which moves the phase difference sensor through the driving mechanism to measure a distance to the target object in the direction perpendicular to a direction of arrangement of the light-receiving components;
a distance-measuring control unit which controls a distance-measuring operation of the distance-measuring apparatus; and
a trapezoid correcting unit which corrects a trapezoidal image projected on the target object based on the distances to the target object obtained from the distance-measuring apparatus in response to an instruction of the distance-measuring control unit.

According to a fourth aspect of the present invention, there is provided a projecting apparatus comprising:

a distance-measuring apparatus including:
a phase difference sensor including a pair of light-receiving components arranged in line;
an optical member provided on a front of the phase difference sensor;
a driving mechanism which supports the optical member such that the optical member faces a target object, and moves the optical member to change a direction of measurement of the phase difference sensor to a direction perpendicular to a direction of arrangement of the light-receiving components; and
a distance-measuring unit which measures a distance to the target object in the direction of arrangement of the light-receiving components while the optical member is set in a given position and moves the optical member through the driving mechanism to measure a distance to the target object in the direction perpendicular to the direction of arrangement of the light-receiving components;
a distance-measuring control unit which controls a distance-measuring operation of the distance-measuring apparatus; and
a trapezoid correcting unit which corrects a trapezoidal image projected on the target object based on the distances to the target object obtained from the distance-measuring apparatus in response to an instruction of the distance-measuring control unit.

According to a fifth aspect of the present invention, there is provided an imaging apparatus comprising:

a distance-measuring apparatus including:
a phase difference sensor including a pair of light-receiving components arranged in line;
a driving mechanism which supports the phase difference sensor such that the light-receiving components face a target object, and moves the phase difference sensor in a direction perpendicular to a direction of arrangement of the light-receiving components; and
a distance-measuring unit which measures a distance to the target object in the direction of arrangement of the light-receiving components while the phase difference sensor is set in a given position and which moves the phase difference sensor through the driving mechanism to measure a distance to the target object in the direction perpendicular to a direction of arrangement of the light-receiving components;
a distance-measuring control unit which controls a distance-measuring operation of the distance-measuring apparatus; and
an automatic focusing unit which focuses light on a subject of the target object based on the distances to the target object obtained from the distance-measuring apparatus in response to an instruction of the distance-measuring control unit.

According to a sixth aspect of the present invention, there is provided an imaging apparatus comprising:

a distance-measuring apparatus including:
a phase difference sensor including a pair of light-receiving components arranged in line;
an optical member provided on a front of the phase difference sensor;
a driving mechanism which supports the optical member such that the optical member faces a target object, and moves the optical member to change a direction of measurement of the phase difference sensor to a direction perpendicular to a direction of arrangement of the light-receiving components; and
a distance-measuring unit which measures a distance to the target object in the direction of arrangement of the light-receiving components while the optical member is set in a given position and which moves the optical member through the driving mechanism to measure a distance to the target object in the direction perpendicular to the direction of arrangement of the light-receiving components;
a distance-measuring control unit which controls a distance-measuring operation of the distance-measuring apparatus; and
an automatic focusing unit which focuses light on a subject of the target object based on the distances to the target object obtained from the distance-measuring apparatus in response to an instruction of the distance-measuring control unit.

According to a seventh aspect of the present invention, there is provided a distance-measuring method comprising:

driving a phase difference sensor, which includes a pair of light-receiving components arranged in line in, in a direction perpendicular to a direction of arrangement of the light-receiving components;

measuring a distance to the target object in the direction of arrangement of the light-receiving components while the phase difference sensor is set in a given position; and moving the phase difference sensor to measure a distance to the target object in the direction perpendicular to a direction of arrangement of the light-receiving components.

According to an eighth aspect of the present invention, there is provided a distance-measuring method comprising:

driving an optical member, which is provided on a front of a phase difference sensor including a pair of light-receiving components arranged in line in, to change a direction of measurement of the phase difference sensor to a direction perpendicular to a direction of arrangement of the light-receiving components;

measuring a distance to the target object in the direction of arrangement of the light-receiving components while the optical member is set in a given position; and moving the optical member to measure a distance to the target object in the direction perpendicular to a direction of arrangement of the light-receiving components.

According to a ninth aspect of the present invention, there is provided a distance-measuring apparatus comprising:

a phase difference sensor including a pair of light-receiving components arranged in line;

a driving mechanism which supports the phase difference sensor such that the light-receiving components face a target object, and moves the phase difference sensor in a direction perpendicular to a direction of arrangement of the light-receiving components; and distance-measuring means for measuring a distance to the target object in the direction of arrangement of the light-receiving components while the phase difference sensor is set in a given position and for moving the phase difference sensor through the driving mechanism to measure a distance to the target object in the direction perpendicular to a direction of arrangement of the light-receiving components.

According to a tenth aspect of the present invention, there is provided a distance-measuring apparatus comprising:

a phase difference sensor including a pair of light-receiving components arranged in line;

an optical member provided on a front of the phase difference sensor;

a driving mechanism which supports the optical member such that the optical member faces a target object, and moves the optical member to change a direction of measurement of the phase difference sensor to a direction perpendicular to a direction of arrangement of the light-receiving components; and distance-measuring means for measuring a distance to the target object in the direction of arrangement of the light-receiving components while the optical member is set in a given position and for moving the optical member through the driving mechanism to measure a distance to the target object in the direction perpendicular to the direction of arrangement of the light-receiving components.

BRIEF DESCRIPTION OF THE SEVERAL VIEWS OF THE DRAWING

FIGS. 10A to 10C are illustrations of the movement of the phase difference sensor at the time of distance measurement in the projector according to the first embodiment of the present invention, in which FIG. 10A shows the phase difference sensor located in a first position, FIG. 10B shows the phase difference sensor located in a second position, and FIG. 10C shows the phase difference sensor located in a third position;

FIGS. 15A to 15C are illustrations of the movement of the prism at the time of distance measurement in the projector according to the second embodiment of the present invention, in which FIG. 15A shows the prism located in a first position, FIG. 15B shows the prism located in a second position, and FIG. 15C shows the prism located in a third position;

FIGS. 17A to 17C are illustrations of the movement of a reflecting mirror of a projector according to a third embodiment of the present invention, in which FIG. 17A shows the reflecting mirror located in a first position, FIG. 17B shows the reflecting mirror located in a second position, and FIG. 17C shows the reflecting mirror located in a third position;

DETAILED DESCRIPTION OF THE INVENTION

A distance-measuring apparatus according to each of first to third embodiments of the present invention will be described with reference to the accompanying drawings. In the embodiments, the distance-measuring apparatus is applied to a projecting apparatus (referred to as a projector hereinafter).

First Embodiment

The projector of the first embodiment includes a driving mechanism capable of driving a "longitudinally-arranged" phase difference sensor in a horizontal direction. The driving mechanism changes the direction of measurement of the phase difference sensor such that the one phase difference sensor can measure the distances to a target object in both horizontal and vertical directions.

The above phrase "longitudinally-arranged" means that the paired light-receiving components incorporated in a phase difference sensor are arranged in a longitudinal direction, or the direction of arrangement of the light-receiving components (sensor arrangement direction) is a vertical direction. In contrast, a phrase "transversally-arranged" means that the paired light-receiving components incorporated in a phase difference sensor are arranged in a transversal direction, or the sensor arrangement direction is a horizontal direction.

Figure 1:
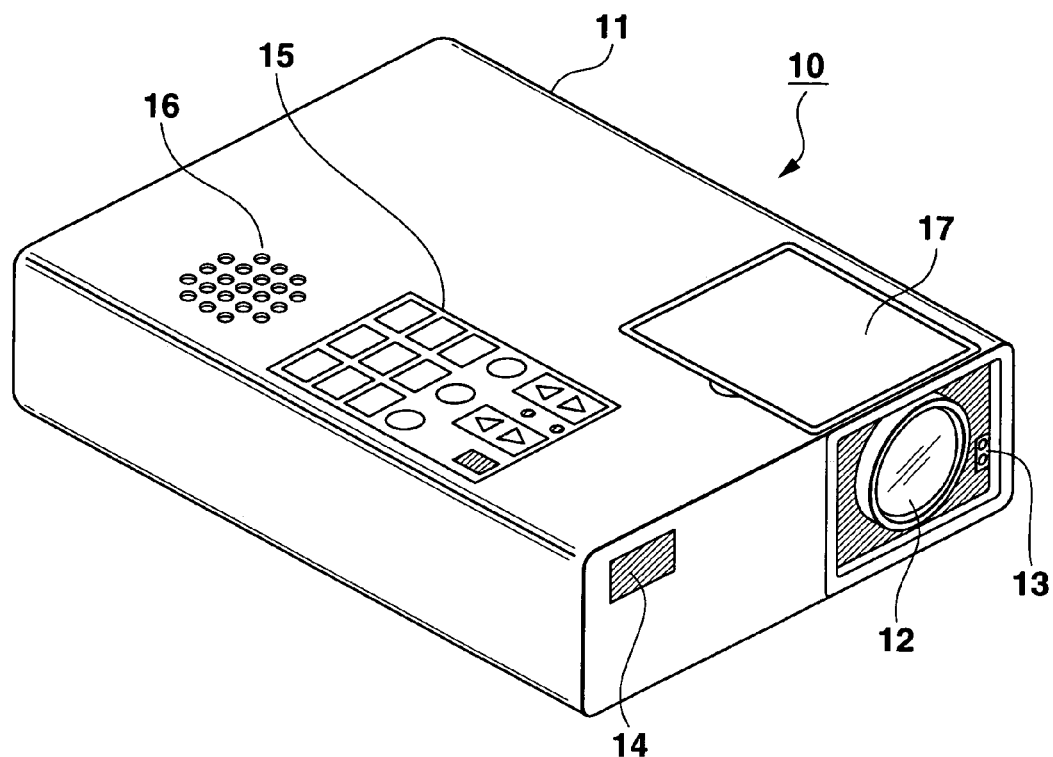
FIG. 1 is a perspective view of a distance-measuring apparatus according to a first embodiment of the present invention, which is applied to a projector, the projector being viewed from above.
Figure 2:
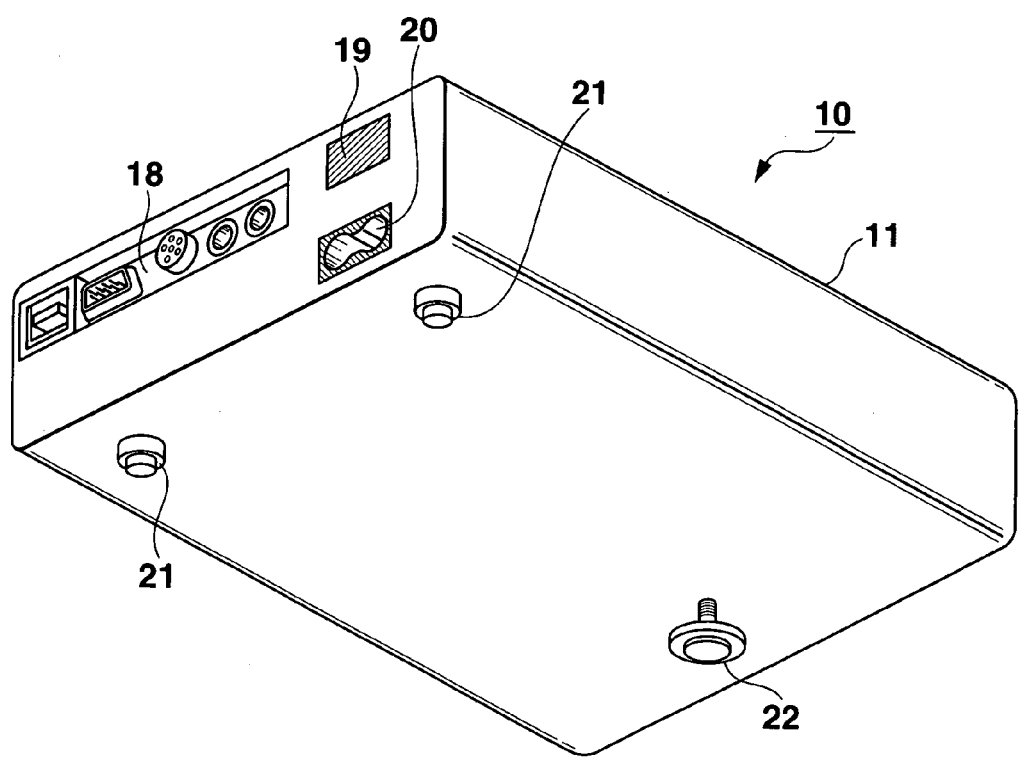
FIG. 2 is a perspective view of the projector according to the first embodiment of the present invention, the projector being viewed from below.

FIGS. 1 and 2 are perspective views of a projector 10 according to the first embodiment of the present invention. Of these figures, FIG. 1 shows the projector viewed from above and FIG. 2 shows the projector viewed from below.

The projector 10 includes a rectangular-parallelepiped main casing 11, a projector lens 12 provided on the front of the main casing 11, a phase difference sensor 13 and an IR receiving unit 14, as shown in FIG. 1.

The projector lens 12 projects an optical image that is formed by a spatial optical modulator such as a micro mirror element (described later). The focal position and zoom position (angle of view) of the projector lens 12 can freely be varied. The phase difference sensor 13 measures the distance to a target object and, more specifically, the distance to the plane on which an image is projected, on the basis of the principle of triangular distance measurement. The structure of the phase difference sensor 13 will be described in detail later.

The IR receiving unit 14 receives infrared light on which a keying signal is superposed from a remote control (not shown) of the projector 10.

On the top of the main casing 11, a main key/indicator 15, a speaker 16 and a cover 17 are arranged.

The main key/indicator 15 includes operation keys such as a power key, a zoom key and a focus key and indicators for displaying the ON/OFF state of a power supply, the temperature of a light source, and the like. The speaker 16 loudly outputs voices when moving images are played back. The cover 17 is opened and closed when a sub-key (not shown) is operated. The operations that cannot be set by the keys of the main key/indicator 15 are performed by the keys of the main key/indicator 15 without using the remote controller of the projector 10.

On the back of the main casing 11, an input/output connector 18, an IR receiving unit 19 and an AC adapter connecting section 20 are arranged as shown in FIG. 2.

The input/output connector 18 includes a USB terminal for connecting the projector 10 to an external device such as a personal computer, a mini D-SUB terminal, an S terminal and an RCA terminal for inputting video signals, and a stereo mini terminal for inputting voice signals. Like the IR receiving unit 14, the IR receiving unit 19 receives infrared light on which a keying signal is superposed from the remote control. The AC adapter connecting section 20 is used to connect a cable of an AC adapter (not shown) serving as a power supply.

A pair of fixing legs 21 is attached to the undersurface of the main casing 11 and close to the back thereof, and a height-adjustable leg 22 is attached to the undersurface of the main casing 11 and close to the front thereof. Screwing the leg 22 manually, a component in a direction perpendicular to the projection direction of the projector lens 12, namely an angle of elevation is adjusted.

Figure 3:
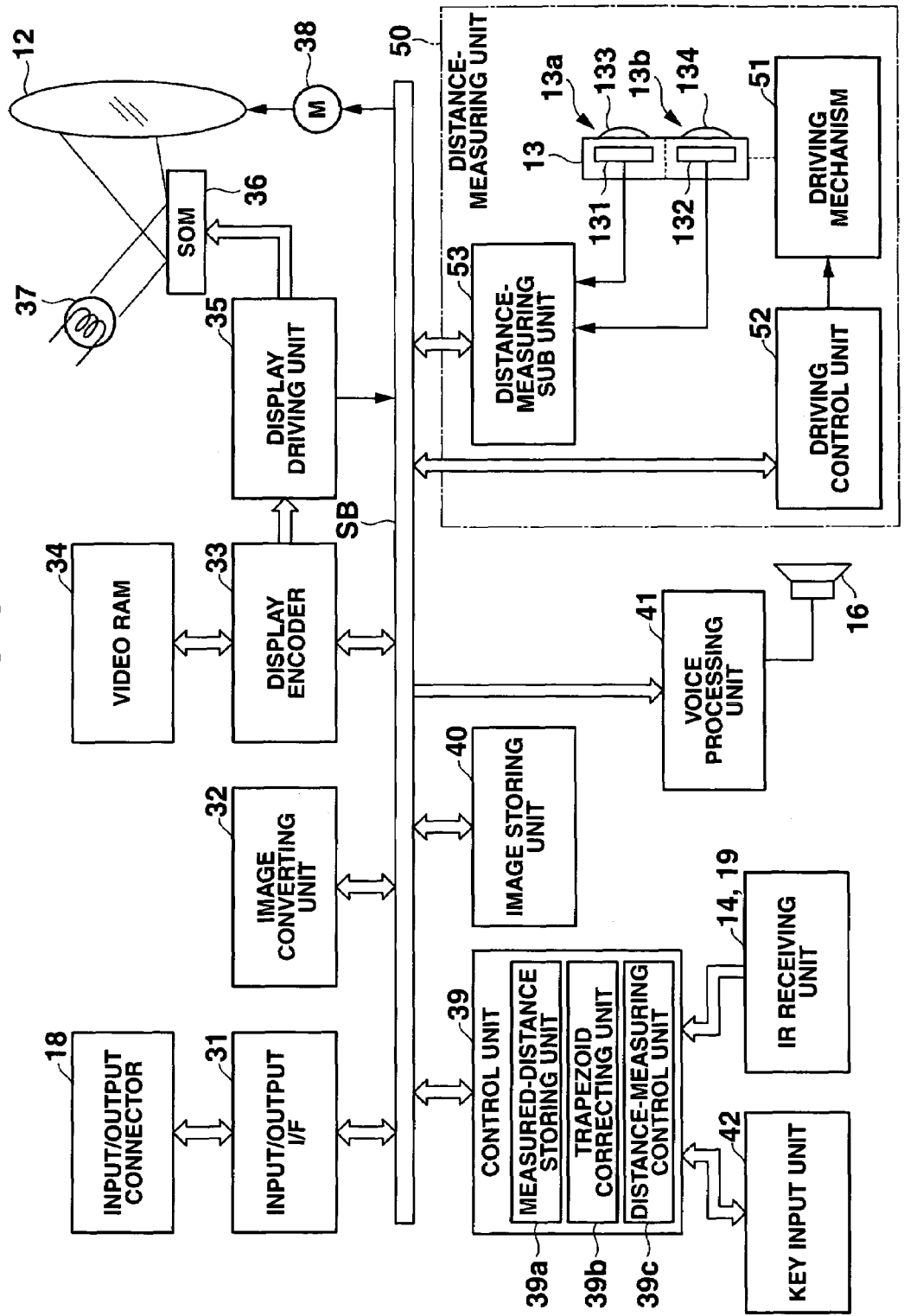
FIG. 3 is a block diagram of the arrangement of an electronic circuit of the projector according to the first embodiment of the present invention.

FIG. 3 is a block diagram of an electronic circuit of the projector 10. As shown in FIG. 3, the input/output connector 18 receives image signals of different formats and supplies them to an image converting unit 32 via an input/output interface (I/F) 31 and a system bus SB. The unit 32 converts the image signals into an image signal of a given format and sends it to a display encoder 33.

The display encoder 33 causes the image signal to be expanded and stored in a video RAM 34. Then, the encoder 33 generates a video signal from the contents stored in the video RAM 34 and supplies it to a display driving unit 35.

The display driving unit 35 drives a spatial optical modulator (SOM) 36 at an appropriate frame rate corresponding to the video signal, e.g., a frame rate of 30 frames per second. The spatial optical modulator 36 is irradiated with high-luminance white light from a light source lamp 37 such as an extra-high voltage mercury lamp to thereby form an optical image. The optical image is then projected on a screen (not shown) through the projector lens 12. The projector lens 12 is driven by a lens motor (M) 38 to shift its zoom position and focus position appropriately.

It is a control unit 39 that controls the operations of all of the circuit components described above. The control unit 39 is a microcomputer and includes a CPU, a ROM that fixedly stores operation programs to be executed by the CPU and a RAM used as a work memory.

An image storing unit 40 and a voice processing unit 41 are connected to the control unit 39 via the system bus SB.

The image storing unit 40 is, for example, a flash memory and stores image data such as a distance-measuring chart image (horizontal chart image and vertical chart image) and a user logo image. The image data is sent to the display encoder 33 and projected on the screen through the projector lens 12.

The voice processing unit 41 includes a sound source circuit such as a PCM sound source. The unit 41 converts voice data, which is provided when the image data is projected, into analog data and drives the speaker 16 to output the analog data loudly.

The main key/indicator 15 and the sub-key (not shown) in the cover 17 compose a key input unit 42. The key input unit 42 supplies a keying signal of the main key/indicator 15 directly to the control unit 39. The IR receiving units 14 and 19 receive an infrared light signal and supply the signal directly to the control unit 39.

The projector 10 also includes a distance-measuring unit 50. The distance-measuring unit 50 has the phase difference sensor 13, a driving mechanism 51, a driving control unit 52 and a distance-measurement processing sub unit 53.

The phase difference sensor 13 is longitudinally arranged on the front of the main casing 11. The sensor 13 includes a pair of photodetectors 13a and 13b arranged in line to detect the distance to a target object using a phase difference system. The photodetectors 13a and 13b have photosensor arrays 131 and 132 and lenses 133 and 134, respectively. The lenses 133 and 134 are provided in front of and in parallel with the photosensor arrays 131 and 132. The lenses 133 and 134 are designed to form a target object on the sensing planes of the photosensor arrays 131 and 132. The photosensor arrays 131 and 132 sense an image of the target object and output it as an electrical signal. The target object is an image that is projected on the screen.

The driving mechanism 51 supports the phase difference sensor 13 such that the sensor 13 faces a target subject, and moves the sensor 13 in a direction perpendicular to the direction of the arrangement of the photodetectors 13a and 13b, i.e., in the horizontal direction. The structure of the driving mechanism 51 will be described in detail later with reference to FIGS. 9 and 10.

The driving control unit 52 drives the driving mechanism 51 in response to an instruction from a distance-measuring control unit 39c of the control unit 39. The distance-measurement processing sub unit 53 measures the distance to a target object using the phase difference sensor 13.

The control unit 39 includes a trapezoid correcting unit 39b that corrects a trapezoidal projection plane on the basis of the distance measured by the distance-measurement processing sub unit 53.

Figure 4:
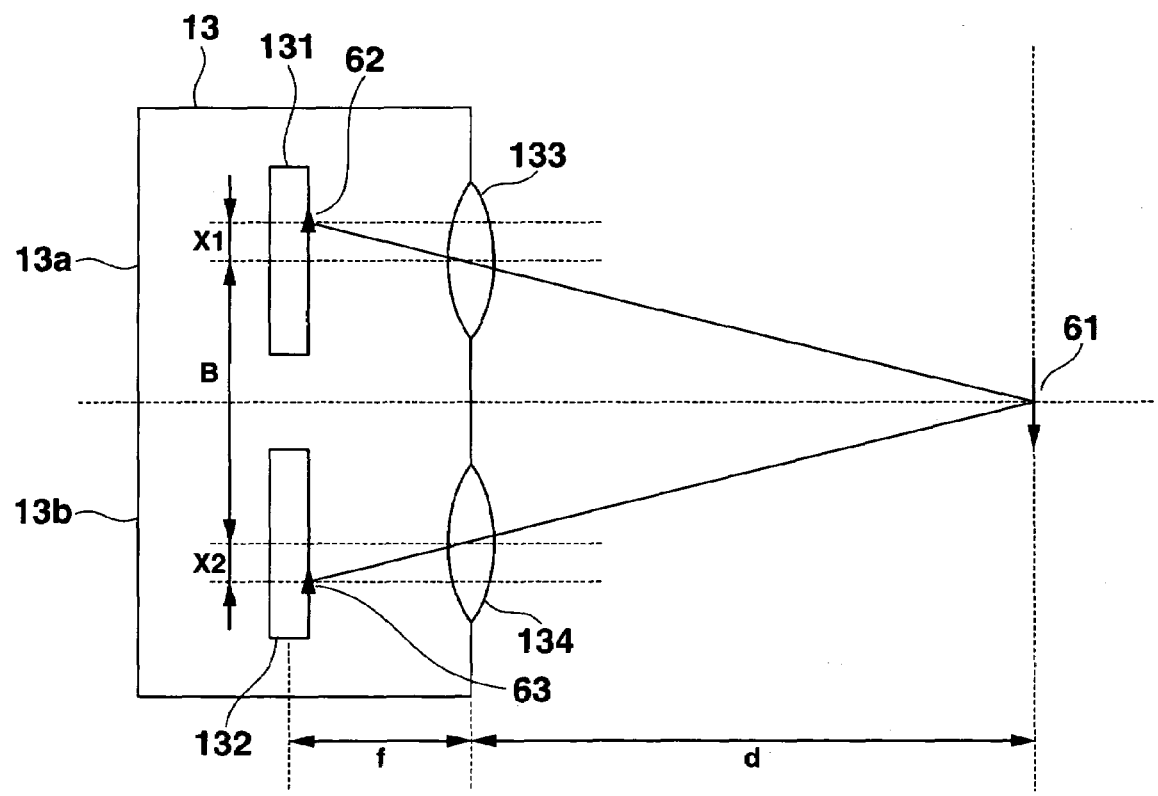
FIG. 4 is an illustration of a distance-measuring method using a phase difference sensor in the projector according to the first embodiment of the present invention.
Figure 5:
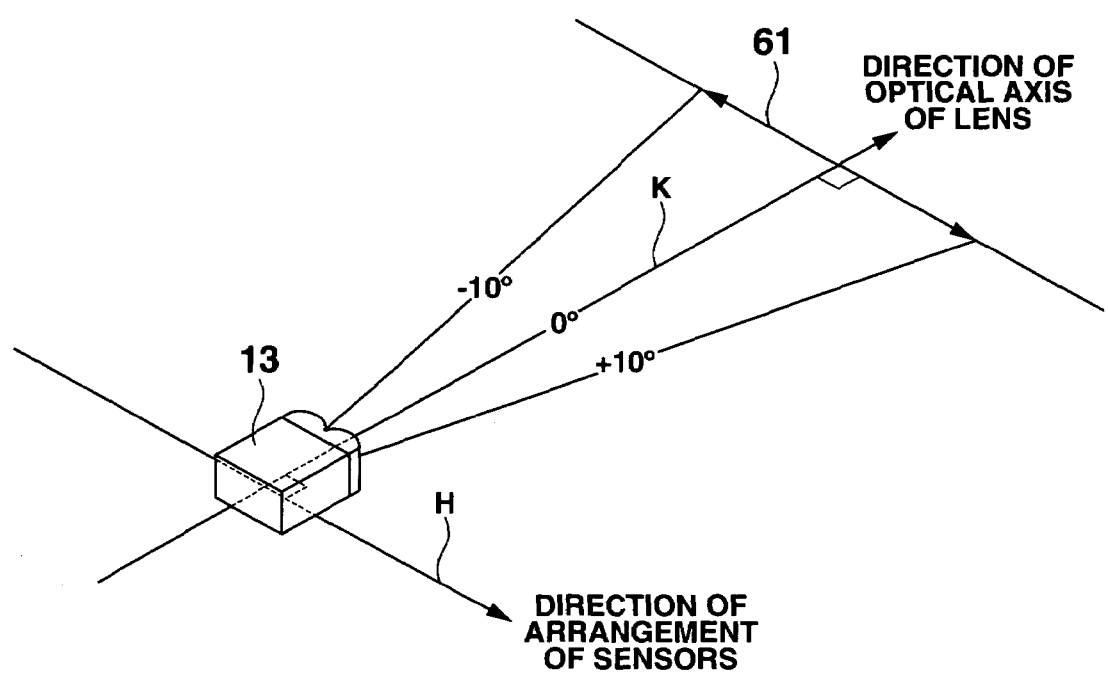
FIG. 5 is an illustration of a multi-point distance-measuring function of the phase difference sensor in the projector according to the first embodiment of the present invention.
Figure 6:
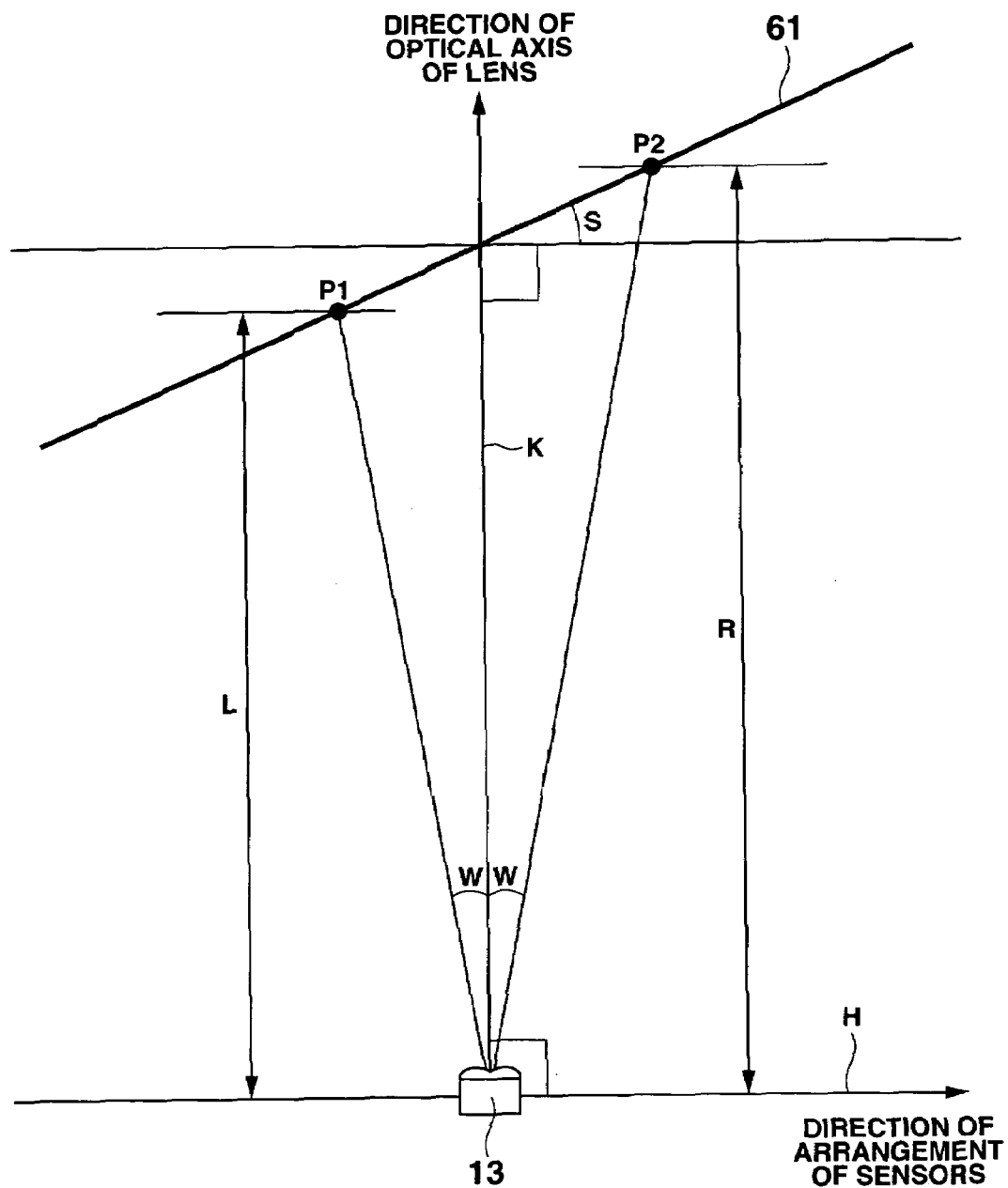
FIG. 6 is an illustration of a method of computing an inclination angle by the phase difference sensor in the projector according to the first embodiment of the present invention.
Figure 7:
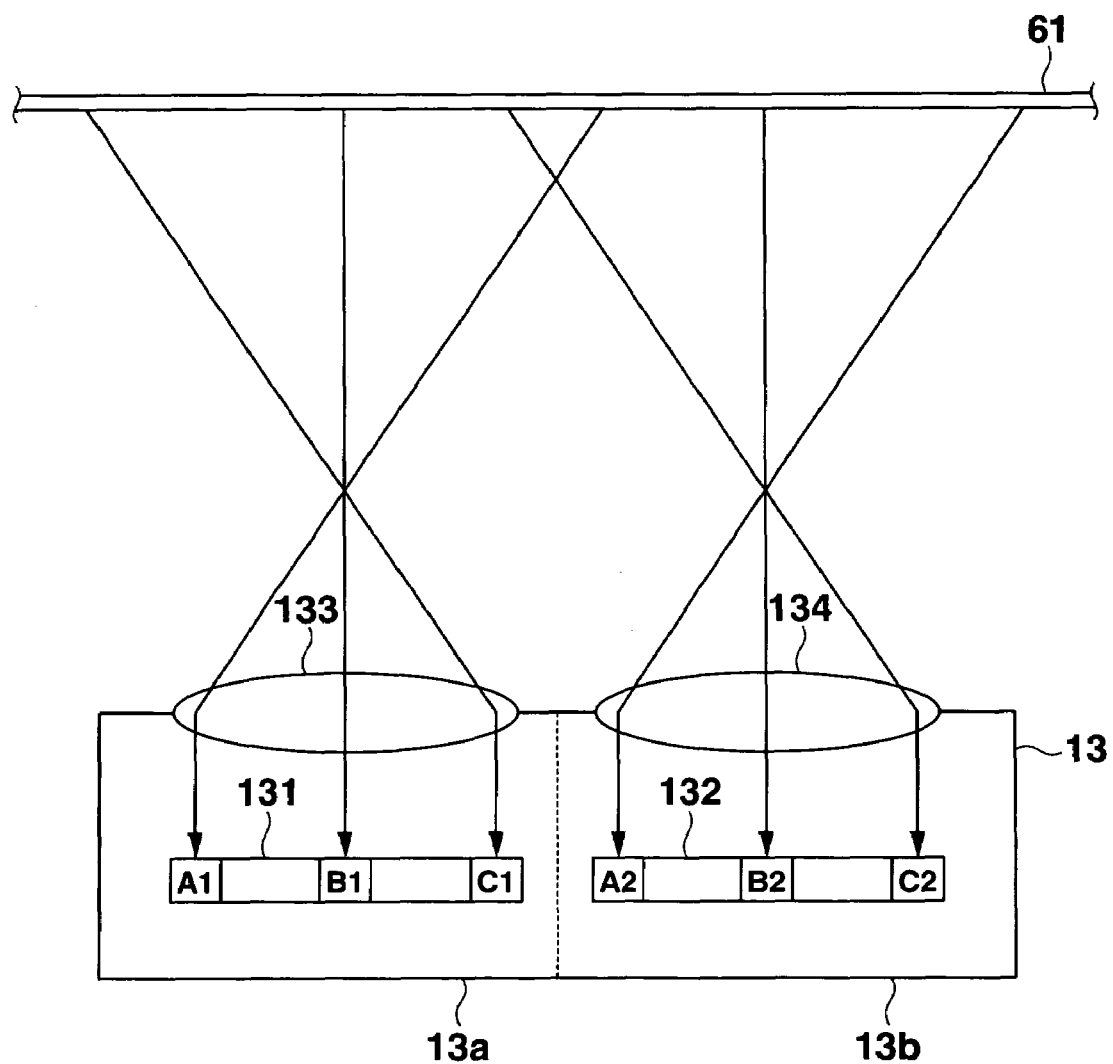
FIG. 7 is an illustration of center-point distance measurement and multi-point distance measurement using the phase difference sensor in the projector according to the first embodiment of the present invention.

For easy understanding of the present invention, a distance-measuring method using a phase difference system will be described with reference to FIGS. 4 to 7. FIG. 4 is an illustration of a distance-measuring method using the phase difference sensor, FIG. 5 is an illustration of a multi-point distance-measuring function of the phase difference sensor, FIG. 6 is an illustration of a method of computing an inclination angle by the phase difference sensor, and FIG. 7 is an illustration of center-point distance measurement and multi-point distance measurement using the phase difference sensor.

As shown in FIG. 4, when the distance to a target object 61 is measured, the target object 61 is irradiated with light from an emitting unit (not shown). The light reflected by the target object 61 is transmitted through the lens 133 and its image is formed on the photosensor array 131. The reflected light is also transmitted through the lens 134 and its image is formed on the photosensor array 132. In FIG. 4, reference numerals 62 and 63 indicate the image forming portions of the photosensor arrays 131 and 132.

Assume that the distance between the center of the lens 133 and the image forming portion 62 is X1 and the distance between the center of the lens 134 and the image forming portion 63 is X2, the distance between the lenses 133 and 134 is B, and the distance of each of the photosensor arrays 131 and 132 and each of the lenses 133 and 134 is f. The distance d to the target object 61 is given by the following equation (1):

$$d = B * f / (x1 + x2) \quad (1)$$

In the equation (1), the distance B and the distance f are each proper to the phase difference sensor 13. The distance d is therefore obtained by the phases (x1, x2) of the photosensor arrays 131 and 132.

As shown in FIG. 5, the phase difference sensor 13 is capable of measuring the distance to the target object 61 within a range of about ±10 degrees toward the direction of arrangement of the photodetectors 13a and 13b from the direction of optical axis K of the sensor 13. This is a multi-point distance-measuring function.

More specifically, measuring the distance to the target object 61 using the central points (B1 and B2) of the photosensor arrays 131 and 132 of the phase difference sensor 13, as shown in FIG. 7, is called "center-point distance measurement." In contrast, measuring the distance to the target object 61 using the other points (A1 and A2, C1 and C2) of the photosensor arrays 131 and 132, as shown in FIG. 7, is called "multi-point distance measurement." The center-point distance measurement is more increased in measurement precision than the multi-point distance measurement, and is not so influenced by a change of the shape of the sensor with time.

As shown in FIG. 6, the projector 10 acquires distance data of plural directions using the multi-point distance-measuring function of the phase difference sensor 13 and computes an inclination angle S of the target object 61 (screen) to the direction of the arrangement of the photodetectors 13a and 13b on the basis of the distance data. Assuming now that the distances to two measurement points P1 and P2 in the direction of optical axis K of the sensor 13 are L and R, and the inclination of the optical axis K is ±W, the inclination angle S of target object 61 is expressed by the following equation (2):

$$S = \tan^{-1}\left(\frac{R-L}{R+L} \times \frac{1}{\tan W}\right) \quad (2)$$

The driving mechanism of the phase difference sensor 13 will be described below.

Figure 8:
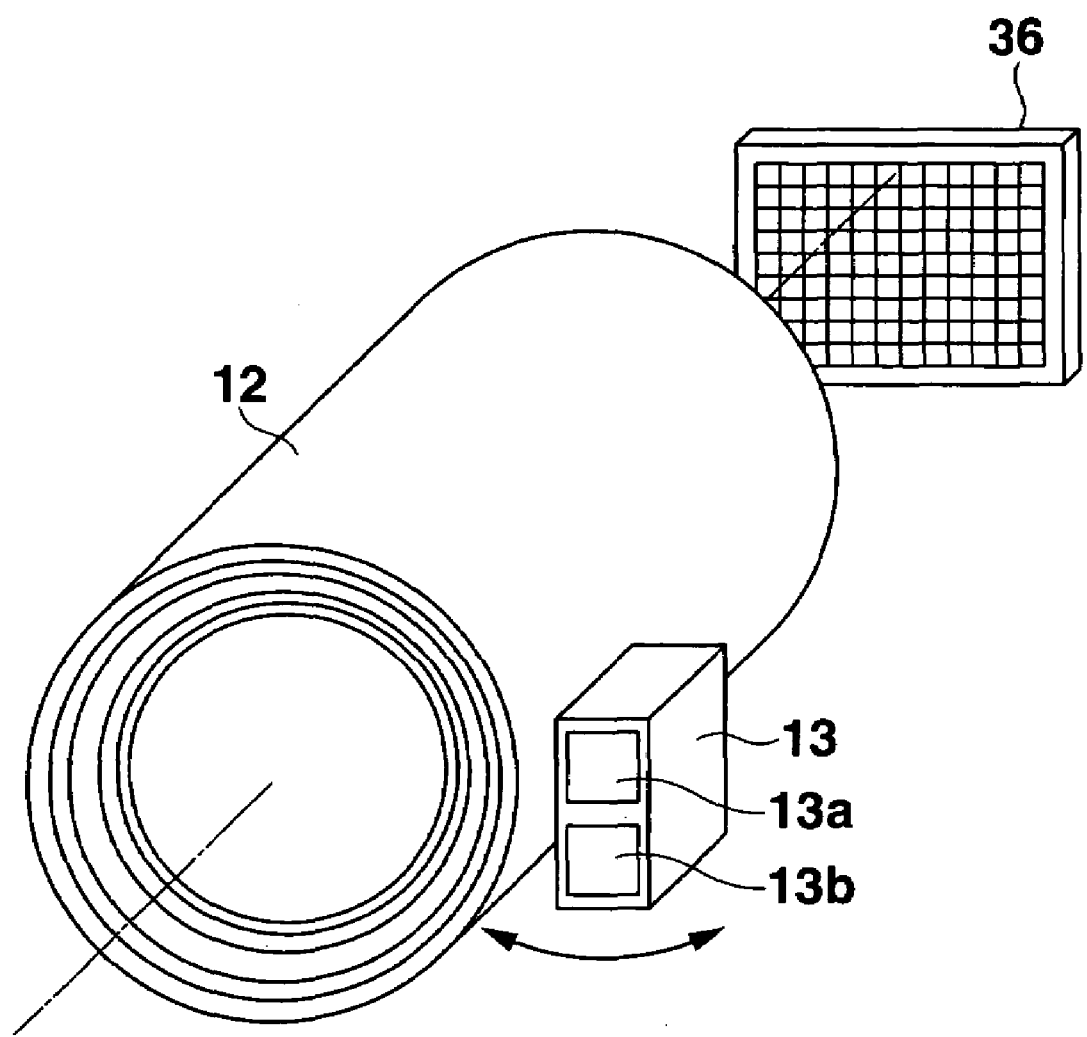
FIG. 8 is a sketch showing a relationship between the projector and the phase difference sensor in the projector according to the first embodiment of the present invention.
Figure 9:
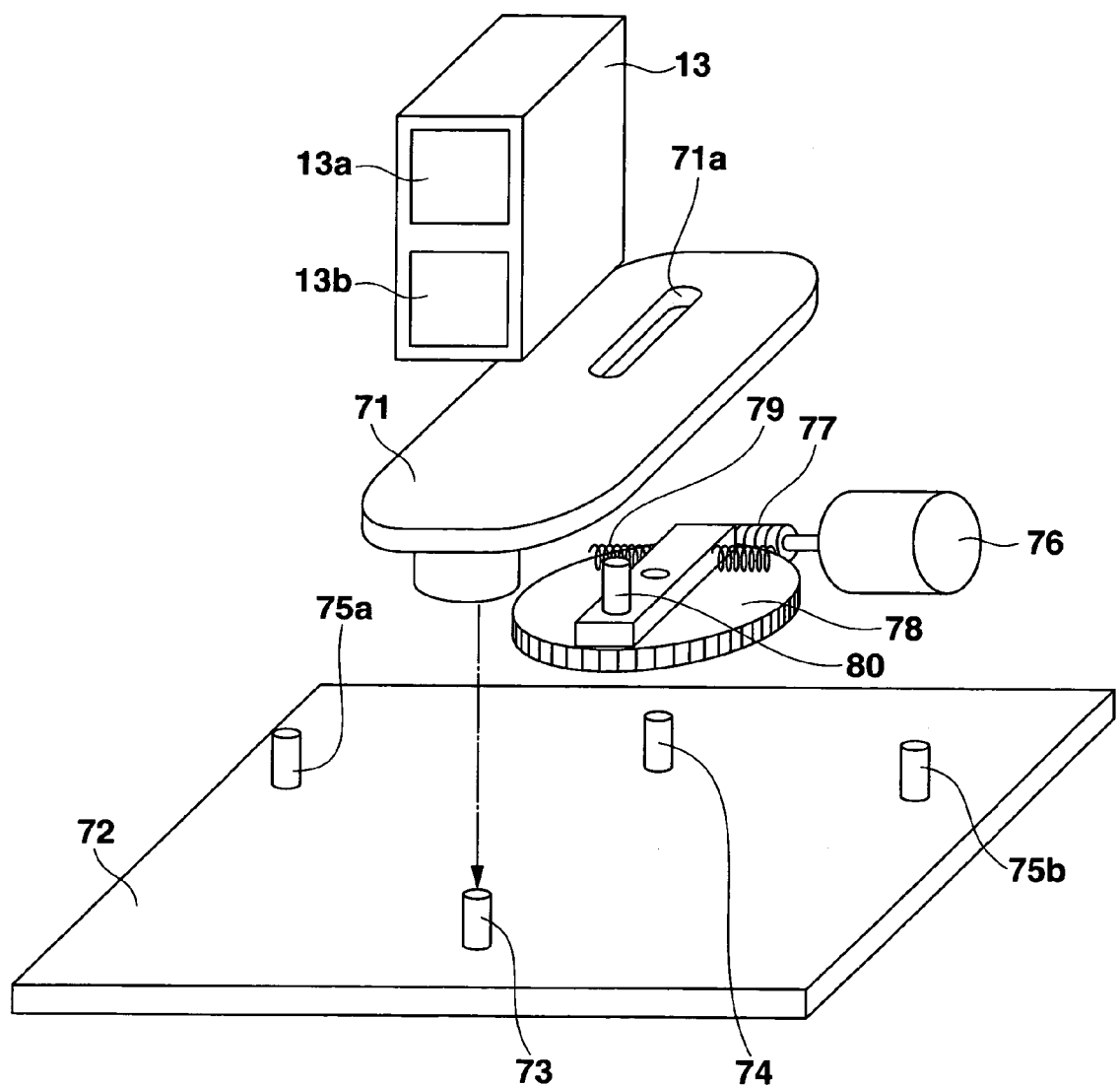
FIG. 9 is an exploded, perspective view showing a specific configuration of a driving mechanism of the phase difference sensor in the projector according to the first embodiment of the present invention.

FIG. 8 is a sketch showing a relationship between the projector and the phase difference sensor. FIG. 9 is an exploded, perspective view showing a specific structure of the driving mechanism of the phase difference sensor.

Referring to FIG. 8, the phase difference sensor 13 is longitudinally arranged close to the projector lens 12. In this structure, the photodetector 13a is arranged above the photodetector 13b. The driving mechanism 51 can adjust the measurement direction of the phase difference sensor 13 in the horizontal direction as indicated by the double-headed arrow.

Referring to FIG. 9, the phase difference sensor 13 is supported on an oscillating table 71 with the photodetectors 13a and 13b arranged longitudinally toward a target object to be measured. The table 71 has a slide hole 71a that is formed to a given length in the longitudinal direction thereof. A pedestal 72 is horizontally provided in the main casing 11. The table 71 is attached to the pedestal 72 such that it can be rotated in the horizontal direction on an oscillating shaft 73 formed on the pedestal 72.

A mechanism for driving the oscillating table 71 in the horizontal direction includes a motor 76, a worm gear 77 coupled to the shaft of the motor 76 and a gear 78 engaged with the worm gear 77. The gear 78 is rotatably attached to a gear shaft 74 on the pedestal 72.

In order to regulate the range of rotation of the oscillating table 71, stopper members 75a and 75b are provided at both ends of the pedestal 72. A link pin 80 is provided on the gear 78 as a mechanism for linking the oscillating table 71 and gear 78 such that the table 71 can be stopped at the maximum angle by the stopper members 75a and 75b even though the control accuracy of the motor 76 is low. The link pin 80 can be slid by a spring 79 and fitted slidably into the slide hole 71a.

Figure 10A:
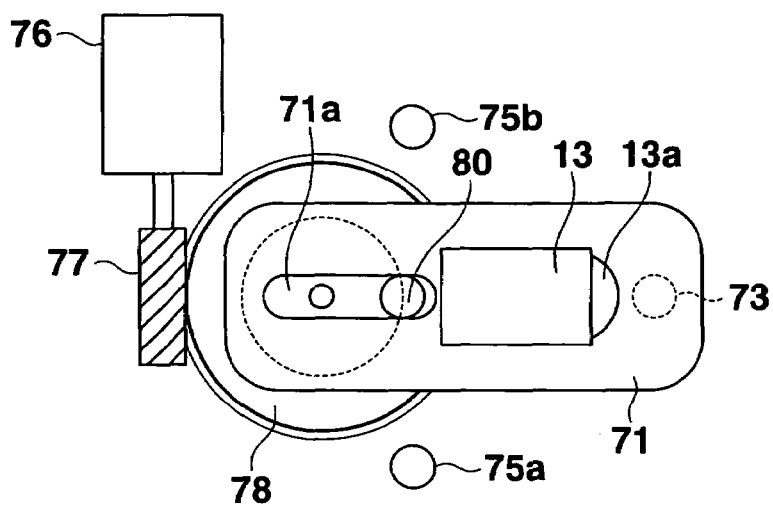
Figure 10B:
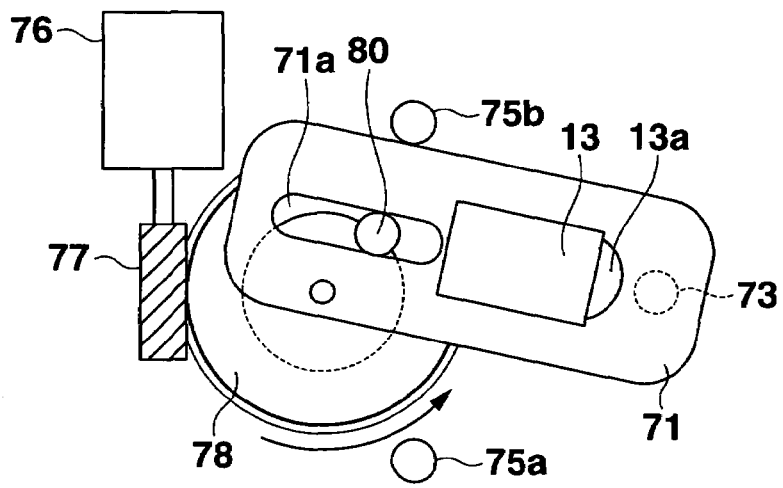
Figure 10C:
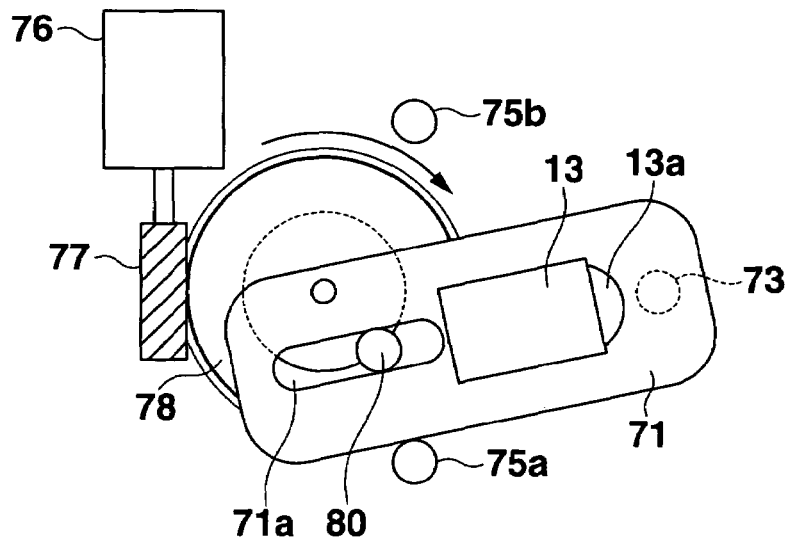

FIGS. 10A to 10C are illustrations of the movement of the phase difference sensor at the time of distance measurement. Of these figures, FIG. 10A shows the phase difference sensor located in a first position, FIG. 10B shows the phase difference sensor located in a second position, and FIG. 10C shows the phase difference sensor located in a third position.

Usually, the phase difference sensor 13 is set in a first position (home position) as shown in FIG. 10A. The first position indicates that the phase difference sensor 13 faces a target object. In this position, the distance to the target object in the vertical direction is measured using the photodetectors 13a and 13b arranged longitudinally. The distance to the target object in the horizontal direction is measured by horizontally moving the phase difference sensor 13 to the second or third position as shown in FIGS. 10B and 10C.

As described above, the phase difference sensor 13 is supported on the oscillating table 71 and its measurement direction can be adjusted in the horizontal direction by the rotation of the table 71. More specifically, when the motor 76 is driven, its torque is transmitted to the gear 78 via the worm gear 77. Thus, the gear 78 rotates and accordingly the table 71 rotates in the horizontal direction through the link pin 80. The range of rotation of the table 71 is regulated by the stopper members 75a and 75b.

Assume here that the position regulated by the stopper member 75b is the second position as shown in FIG. 10B. In the second position, the phase difference sensor 13 faces a target object only at a given angle in one direction (right direction in FIG. 10B).

Assume here that the position regulated by the stopper member 75a is the third position as shown in FIG. 10C. In the third position, the phase difference sensor 13 faces a target object only at a given angle in a direction (left direction in FIG. 10C) opposite to the above one direction.

Since the motor 76 is driven to rotate the oscillating table 71 in the horizontal direction, the measurement direction of the phase difference sensor 13 is adjusted horizontally within a given range. Consequently, the distance to a target object in the horizontal direction can be measured.

An operation of processing an image projected by the projector 10 with the phase difference sensor 13 will be described.

Figure 11:
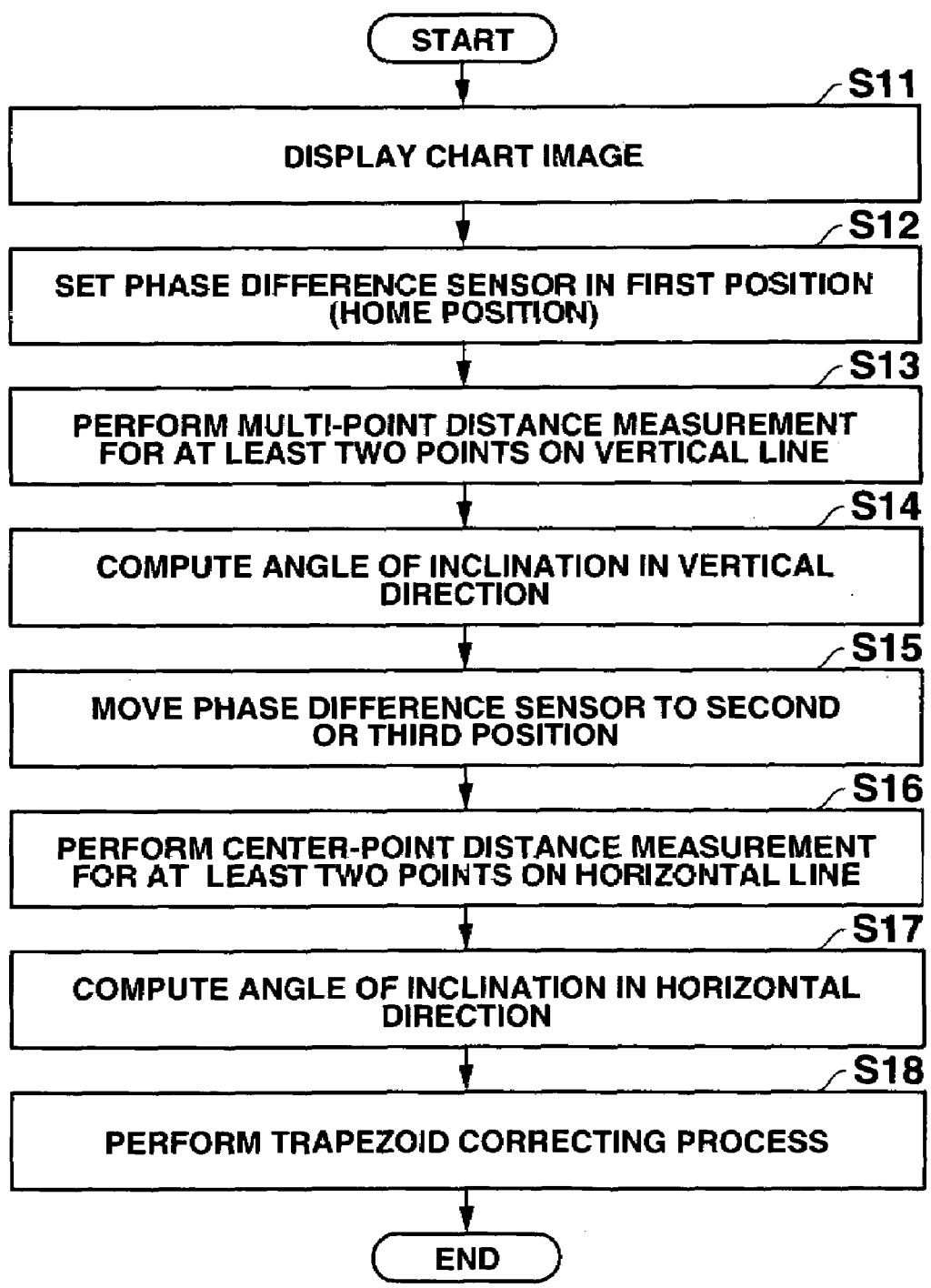
FIG. 11 is a flowchart showing an operation of processing an image projected by the projector according to the first embodiment of the present invention.

FIG. 11 is a flowchart showing an operation of processing an image projected by the projector. The operation is performed when a program is loaded by the control unit (microcomputer) 39 including a CPU.

When an image is projected on a screen provided in front of the projector 10, the control unit 39 first causes the projection system including the projector lens 12 to project and display a chart image for distance measurement on the basis of the image data stored in the image storing unit 40 (step S11). The chart image includes a pattern image having, for example, black-and-white horizontal stripes. The reason why the chart image is displayed is that the screen is usually white only and thus the phase difference sensor 13 cannot read a measurement point.

Then, while the chart image is displayed, the control unit 39 gives an instruction to drive the driving control unit 52 shown in FIG. 3 and sets the phase difference sensor 13 in the first position through the driving mechanism 51 (step S12). The first position indicates that the phase difference sensor 13 faces a target object, or the optical axis of the sensor 13 is perpendicular to the horizontal plane of the target object. The phase difference sensor 13 is usually set in the first position as a home position.

When the phase difference sensor 13 is set in the first position, the control unit 39 performs multi-point distance measurement for at least two points on the vertical line of the chart image through the distance-measurement processing sub unit 53 (step S13). The multi-point distance measurement is to measure the distance to a target object using points (e.g., both ends) other than the central point of each of the photodetectors 13a and 13b of the phase difference sensor 13, as has been described with reference to FIG. 7.

Figure 12:
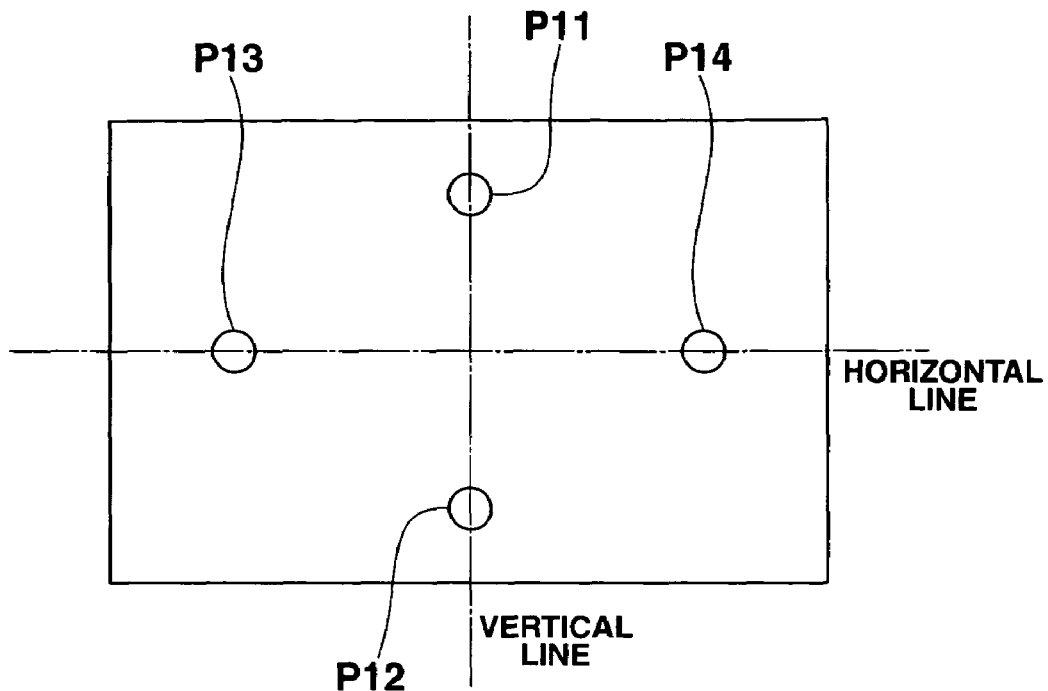
FIG. 12 is a chart showing an example of measurement points of the projector according to the first embodiment of the present invention.

FIG. 12 shows an example of measurement points for the multi-point distance measurement. When the phase difference sensor 13 is set in the first position, measurement points P11 and P12 shown in FIG. 12 are read in sequence by points (e.g., both ends) other than the central points of the photodetectors 13a and 13b. More specifically, the brightness of white points corresponding to the measurement points P11 and P12 of a black-and-white pattern of the chart image is read, and the distance to each of the measurement points P11 and P12 is measured by the distance-measurement processing sub unit 53. The measured distance is stored in a measured-distance storing unit 39a provided in the control unit 39.

On the basis of the distances stored in the storing unit 39a, the control unit 39 computes an angle "θv" at which the projection plane of the screen is inclined in the up-and-down direction, or the vertical direction, with respect to the optical axis (step S14).

After that, the control unit 39 gives an instruction to drive the driving control unit 52 to move the phase difference sensor 13 to the second and third positions through the driving mechanism 51 (step S15). In the second and third positions, the phase difference sensor 13 faces a target object only at a given angle in the horizontal direction, as shown in FIGS. 10B and 10C.

Under the above condition, the control unit 39 performs center-point distance measurement for at least two points on the horizontal line of the chart image through the distance-measurement processing sub unit 53 (step S16). The center-point distance measurement is to measure the distance to a target object using central points of the photodetectors 13a and 13b of the phase difference sensor 13, as has been described with reference to FIG. 7.

In the example shown in FIG. 12, when the phase difference sensor 13 is set in the second and third positions, the measurement points P13 and P14 are read in sequence by the central points of the photodetectors 13a and 13b, and the distance to each of the measurement points P13 and P14 is measured by the distance-measurement processing sub unit 53. The measured distance is stored in the measured-distance storing unit 39a provided in the control unit 39.

On the basis of the distances stored in the storing unit 39a, the control unit 39 computes an angle "θh" at which the projection plane of the screen is inclined in the right-and-left direction, or the horizontal direction, with respect to the optical axis (step S17).

After that, the trapezoid correcting unit 39b of the control unit 39 performs a trapezoid correcting process for a projected image on the basis of the angle "θv" obtained in step S14 and the angle "θh" obtained in step S17 (step S18). More specifically, the unit 39b computes an angle necessary for trapezoid correction to determine which direction and how many angles the projection plane of the screen is inclined and to form the screen as a rectangle having a proper aspect ratio that is the same as that of a projected image. The display encoder 33 corrects the ratio of the upper side to the lower side of image data expanded and stored in the video RAM 34 and the ratio of the right side to the left side thereof.

Figure 13:
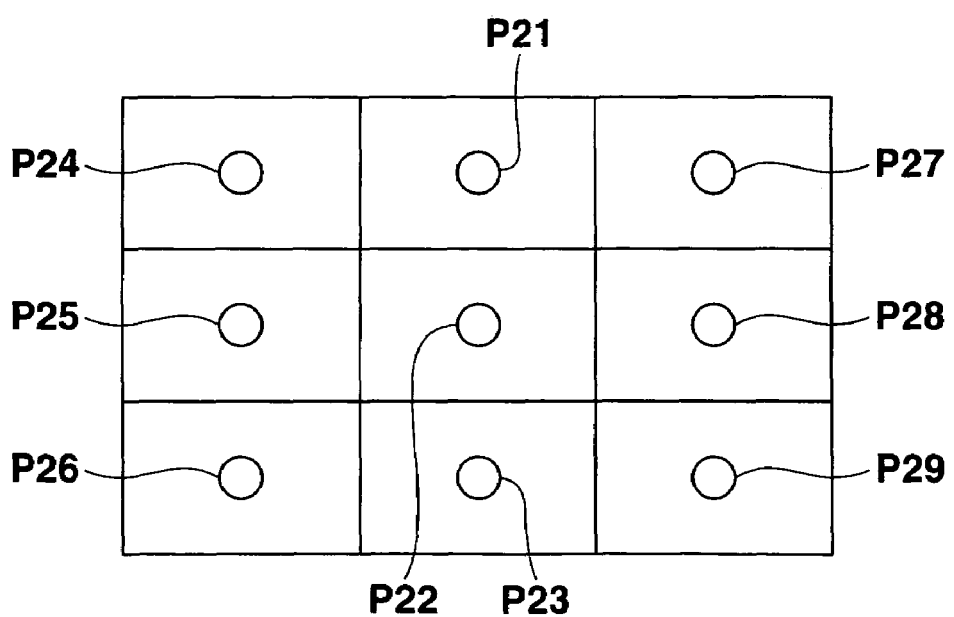
FIG. 13 is a chart showing another example of measurement points of the projector according to the first embodiment of the present invention.

According to the first embodiment described above, the distance to each of two points in the vertical direction is measured and so is the distance to each of two points in the horizontal direction. For example, the distance to each of nine points arranged in matrix can be measured, as shown in FIG. 13. When the phase difference sensor 13 is set in the first position, the distance to each of measurement points P21 to P23 is measured. Then, the sensor 13 moves in the horizontal direction. When the sensor 13 is set in the second position, the distance to each of measurement points P24 to P26 is measured. When the sensor 13 is set in the third position, the distance to each of measurement points P27 to P29 is measured. The distance to each of measurement points P22, P25 and P28 is measured by the center-point distance measurement. If the distance measurement is performed for the nine measurement points, the inclination of a projected image can accurately be corrected.

In the first embodiment, the distance measurement in the vertical direction is performed first. However, the distance measurement in the horizontal direction can be done first.

The inclination of a projected image can be corrected by measuring the distance to each of three measurement points none of which are aligned with one another if a relationship in position among the three measurement points has only to be clarified.

In the example shown in FIG. 13, the distance to each of six measurement points P24 to P26 and P27 to P29 can be measured, or the distance to each of three measurement points P25, P27 and P28 or three measurement points P24, P25 and P28 can be measured. Time for inclination correction can thus be shortened.

Moreover, the distance measurement for not nine measurement points but more measurement points such as sixteen points (4×4) and twenty-five points (5×5) can be performed. Inclination can thus be corrected with high precision.

The longitudinally-arranged phase difference sensor 13 need not be moved in the horizontal direction, but can be done in a direction other than the vertical direction. If the direction in which the sensor 13 moves differs from the directions of the photodetectors 13a and 13b of the sensor 13, at least two-dimensional distance measurement can be performed. In other words, when the sensor 13 is longitudinally arranged, it can be moved in a direction other than the vertical direction.

If the sensor 13 is arranged transversally or diagonally, it can be moved in a direction other than the direction of arrangement of the sensor 13.

As described above, the driving mechanism 51 for moving the longitudinally-arranged phase difference sensor 13 in the horizontal direction allows the sensor 13 to perform distance measurement in both the horizontal and vertical directions.

Second Embodiment

A projector according to a second embodiment of the present invention will be described.

In the first embodiment, the phase difference sensor is moved to change the direction of distance measurement. In the second embodiment, when a phase difference sensor is longitudinally fixed and arranged, an optical member provided on the front of the sensor is moved to change the direction of distance measurement. A prism is used as the optical member.

Since the circuit arrangement and data processing of a projector 10 of the second embodiment are basically the same as those of the projector of the first embodiment, their descriptions are omitted.

Figure 14:
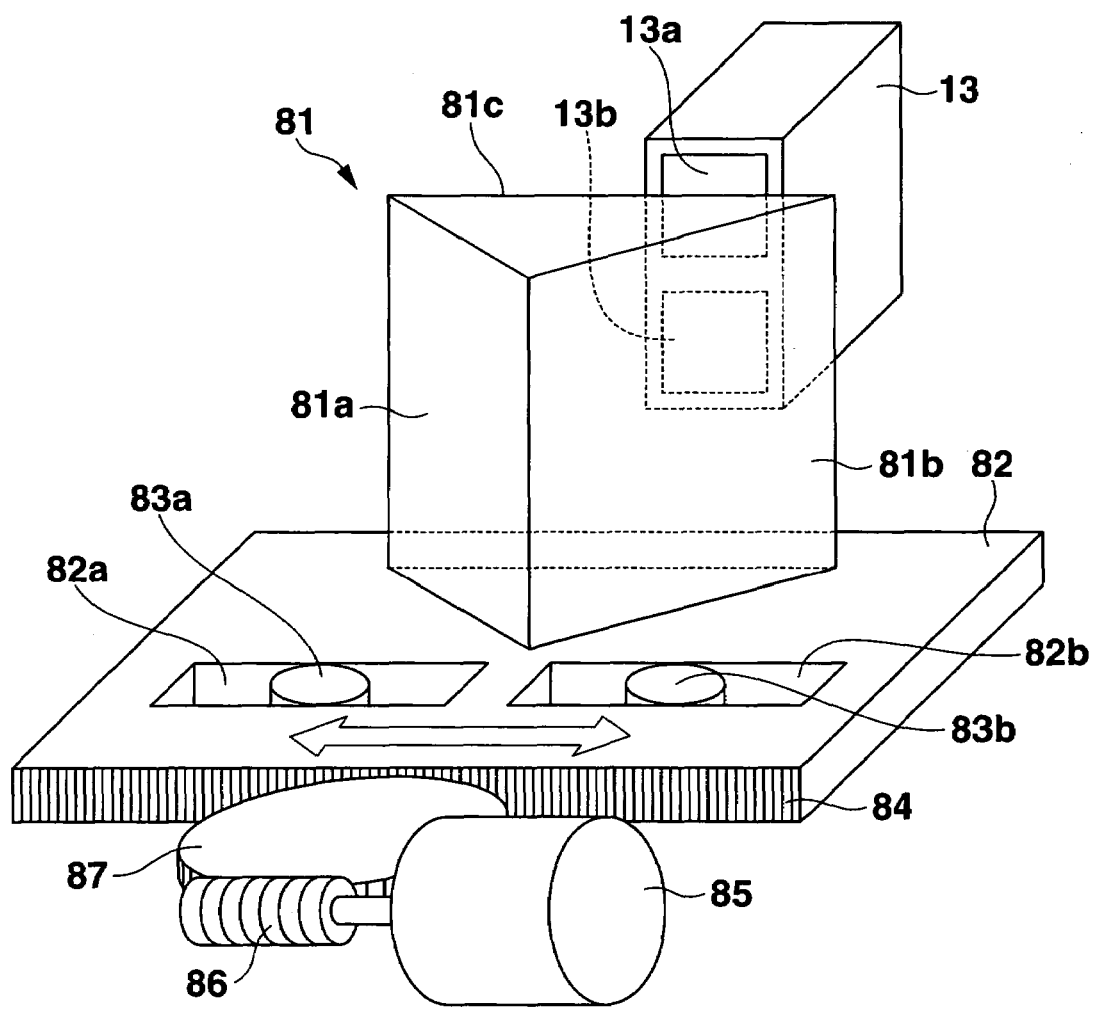
FIG. 14 is a perspective view specifically showing a structure of a driving mechanism of a projector according to a second embodiment of the present invention, the driving mechanism including a prism.

FIG. 14 is a perspective view specifically showing a structure of a driving mechanism of the projector according to the second embodiment, in which a prism is used as an optical member.

The phase difference sensor 13 is longitudinally fixed and arranged in a main casing 11 of the projector 10. A prism 81 whose end face is shaped like an isosceles triangle is provided in front of the sensor 13. The prism 81 has three rectangular light-receiving surfaces 81a to 81c. Of these light-receiving surfaces, the light-receiving surface 81c is arranged in parallel with the sensing planes of photodetectors 13a and 13b and supported on a parallel-moving plate 82.

A pair of slide holes 82a and 82b is formed to a given length in the horizontal direction thereof. Stopper members 83a and 83b are slidably fitted into the slide holes 82a and 82b, respectively. Gear teeth 84 are formed on one side of the parallel-moving plate 82.

A mechanism for sliding the parallel-moving plate 82 includes a motor 85, a worm gear 86 coupled to the shaft of the motor 85 and a gear 87 engaged with the worm gear 86. The gear 87 is fitted to the gear teeth 84 of the parallel-moving plate 82.

Figure 15A:
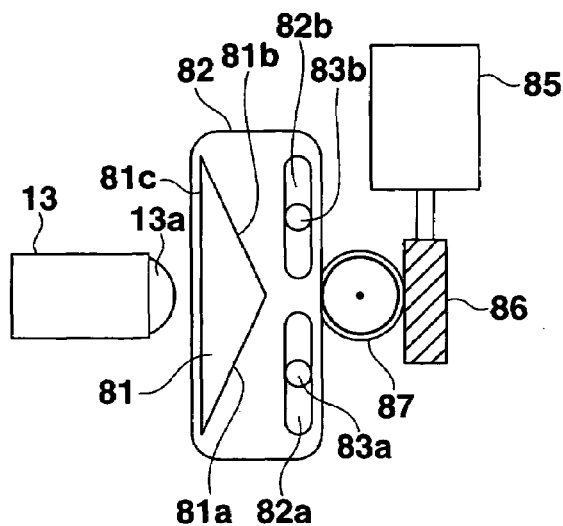
Figure 15B:
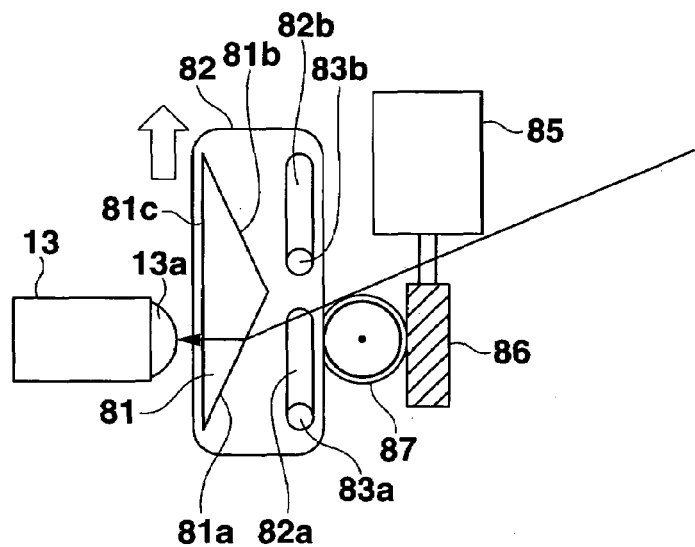
Figure 15C:
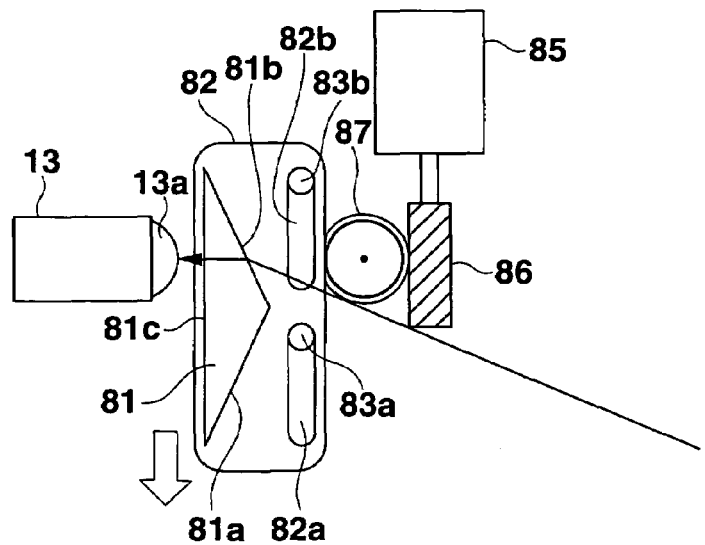

FIGS. 15A to 15C are illustrations of the movement of the prism 81 at the time of distance measurement. FIG. 15A shows the prism 81 located in a first position, FIG. 15B shows the prism 81 located in a second position, and FIG. 15C shows the prism 81 located in a third position.

The prism 81 is usually set in the first position (home position) as shown in FIG. 15A. In the first position, the vertex of an isosceles triangle formed by light-receiving surfaces 81a to 81c of the prism 81 is located on the optical axis of the phase difference sensor 13, as indicated by a one-dot-one-dash line. In the first position, however, there is possibility that light reflected by a target object will be diffused in the prism 81. To avoid this, relative positions between the sensor 13 and prism 81 are slightly displaced from each other, so that light reflected by a target object enters the photodetectors 13a and 13b almost straightly through the light-receiving surfaces 81a and 81b.

When the distance to a target object is measured, a chart image for distance measurement is first projected and displayed. While the prism 81 is set in the first position, the phase difference sensor 13 measures the distance in the vertical direction. In this case, multi-point distance measurement for at least two points is performed using points (e.g., both ends) other than the central point of each of the photodetectors 13a and 13b of the sensor 13.

After that, the parallel-moving plate 82 moves to the second or third position parallel to itself to measure the distance in the horizontal direction, as shown in FIGS. 15B and 15C. The prism 81 is supported on the plate 82 as described above. When the motor 85 is driven, its torque is transmitted to the gear 87 through the worm gear 86. Thus, the gear 87 rotates and accordingly the plate 82 moves in the horizontal direction. As the plate 82 moves, the stopper members 83a and 83b slide in the slide holes 82a and 82b, with the result that the movement of the plate 82 is controlled to fall within a range of the slide holes 82a and 82b.

When the parallel-moving plate 82 moves to the second position, the stopper member 83a stops at one end of the slide hole 82a and the stopper member 83b stops at one end of the slide hole 82b, as shown in FIG. 15B. In the second position, light reflected by a target object is refracted at a given angle through the light-receiving surface 81a of the prism 81 and enters the phase difference sensor 13.

When the parallel-moving plate 82 moves to the third position, the stopper member 83a stops at the other end of the slide hole 82a and the stopper member 83b stops at the other end of the slide hole 82b, as shown in FIG. 15C. In the third position, light reflected by a target object is refracted at a given angle through the light-receiving surface 81b of the prism 81 and enters the phase difference sensor 13.

As described above, the prism 81 is moved to the second and third positions such that the phase difference sensor 13 can measured the distance to a target object in the right-and-left direction or the horizontal direction using the index of refraction of the prism 81. In this case, center-point distance measurement for at least two points is performed using the central points of the photodetectors 13a and 13b of the phase difference sensor 13.

The process performed after the distance measurement is the same as that in the first embodiment. Specifically, the inclination of a projected image is computed on the basis of distance measurement data of measurement points in the vertical and horizontal directions, which are obtained by the phase difference sensor 13, and the distortion of the projected image is corrected in accordance with the inclination.

Though the prism 81 provided in front of the phase difference sensor 13 has to be moved, the one phase difference sensor 13 can measure the distances to a target object in both the vertical and horizontal directions as in the first embodiment.

Modification

Figure 16:
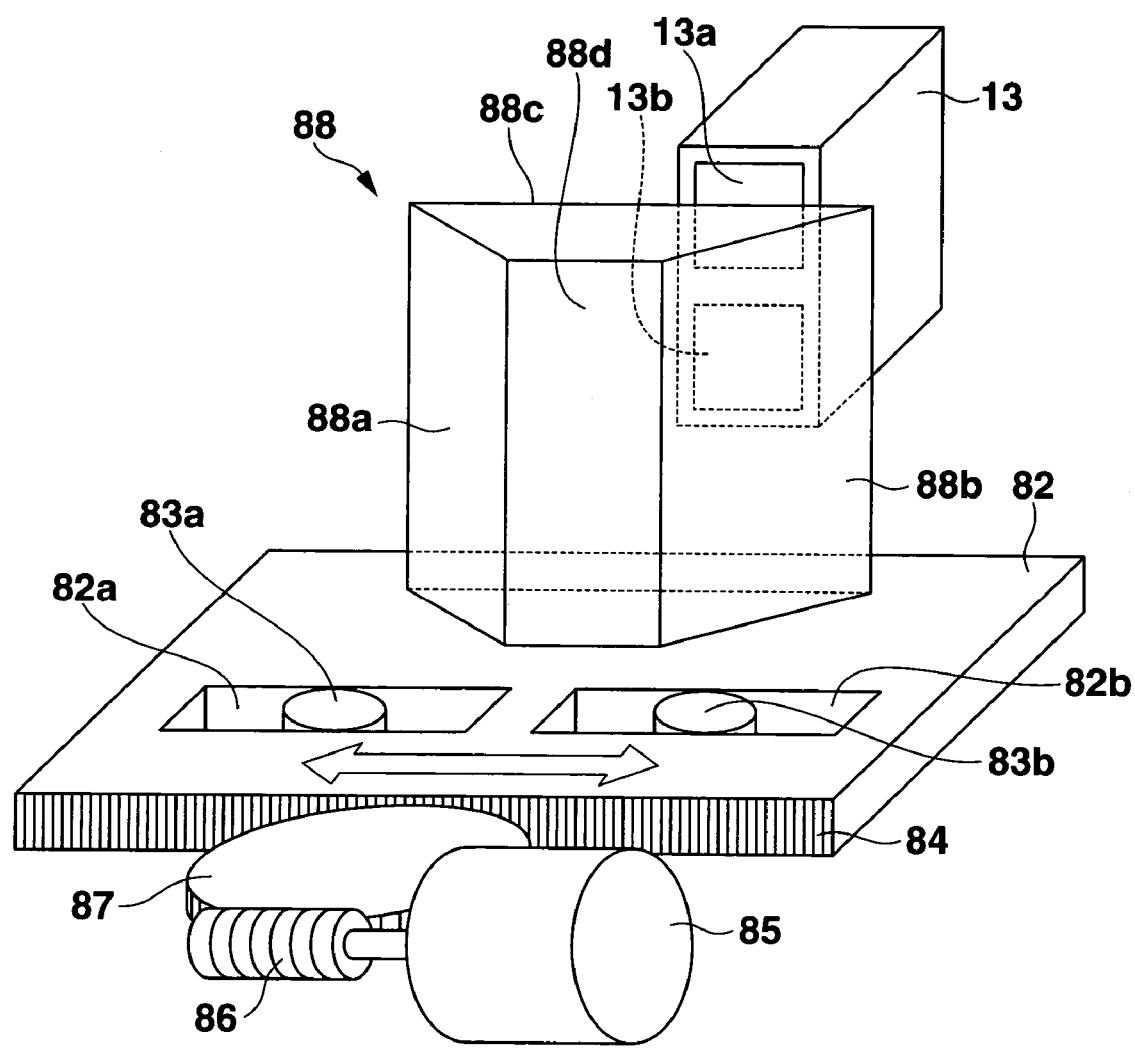
FIG. 16 is a perspective view showing a structure of a driving mechanism of a projector according to a modification to the second embodiment of the present invention, the driving mechanism including an isosceles-trapezoidal prism.

In the second embodiment, the prism 81 whose end face is shaped like an isosceles triangle is used. However, a prism 88 whose end face is shaped like an isosceles trapezoid can be used as shown in FIG. 16. The prism 88 has four rectangular light-receiving surfaces 88a to 88d. Of these light-receiving surfaces, the surface 88c is supported on the parallel-moving plate 82 in parallel with the sensing planes of photodetectors 13a and 13b of the phase difference sensor 13.

When the prism 88 is set in the first position, the light-receiving surface 88d of the prism 88 faces the sensing planes of the photodetectors 13a and 13b as shown in FIG. 16. The phase difference sensor 13 can receive light straightly reflected by a target object through the light-receiving surface 88d. Unlike in the case where the prism 81 is used, the position need not be adjusted.

In addition to the prism 81 and prism 88, for example, a cylindrical lens can be used. The cylindrical lens has refractive power on its one section only.

Third Embodiment

A projector according to a third embodiment of the present invention will be described.

In the third embodiment, a phase difference sensor is longitudinally fixed and arranged, and a reflecting mirror is provided in front of the phase difference sensor. The direction of the reflecting mirror is adjusted to change the direction of measurement of the phase difference sensor.

Since the circuit arrangement and data processing of the projector of the third embodiment are basically the same as those of the projector of the first embodiment, their descriptions are omitted.

Figure 17A:
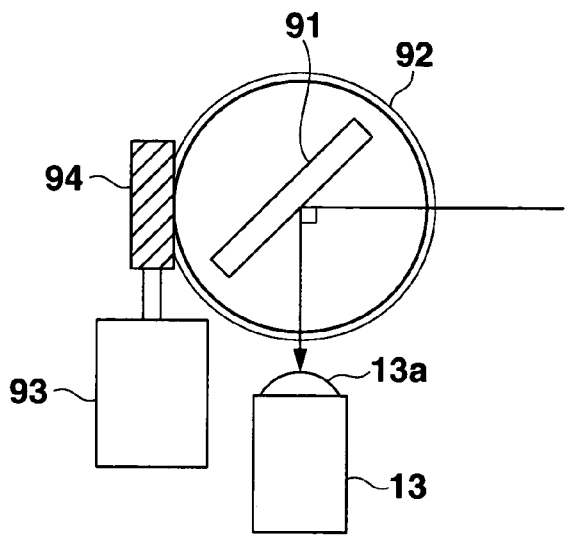
Figure 17B:
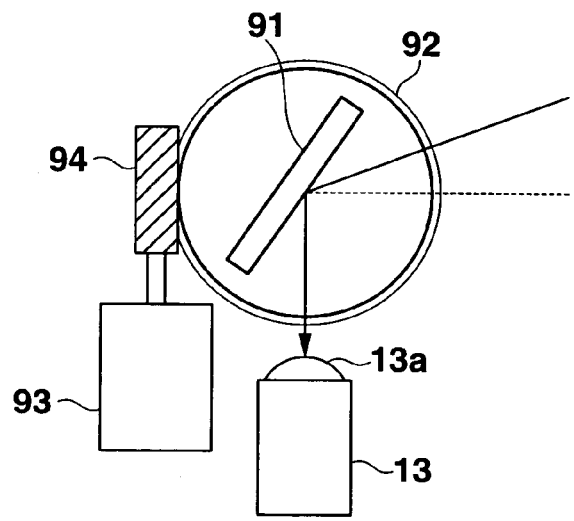
Figure 17C:
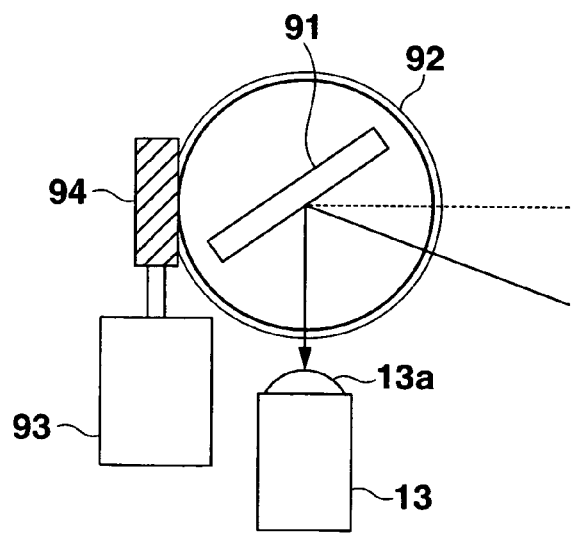

FIGS. 17A to 17C are illustrations of the movement of a reflecting mirror of the projector according to the third embodiment. FIG. 17A shows the reflecting mirror located in a first position, FIG. 17B shows the reflecting mirror located in a second position, and FIG. 17C shows the reflecting mirror located in a third position.

A phase difference sensor 13 is longitudinally fixed and arranged in a main casing 11 of a projector 10. A reflecting mirror 19 is provided in front of the sensor 13. The reflecting mirror 19 is provided above a gear 92 such that the angle of the mirror 19 with respect to the sensor 13 can be varied. The gear 92 is rotated through a worm gear 94 by driving a motor 93.

Usually, the reflecting mirror 91 is so positioned that the reflection angle of the reflecting mirror 91 with respect to the phase difference sensor 13 becomes 90 degrees, as shown in FIG. 17A. This state is defined as a first position (home position).

When the distance to a target object is measured, a chart image for distance measurement is first projected and displayed. While the reflecting mirror 91 is set in the first position, the phase difference sensor 13 measures the distance in the vertical direction. In this case, multi-point distance measurement for at least two points is performed using points (e.g., both ends) other than the central point of each of the photodetectors 13a and 13b of the sensor 13.

After that, the direction of the reflecting mirror 91 is changed to the second or third position to measure the distance in the horizontal direction, as shown in FIGS. 17B and 17C. As described above, the reflecting mirror 91 is supported on the gear 92 and the gear 92 is rotated through the worm gear 94 by driving the motor 93. The position in which the mirror 91 is rotated by a given angle in one direction from the first position by the rotation of the gear 92 is defined as the second position, while the position in which the mirror 91 is rotated by a given angle in an opposite direction from the first position is defined as the third position.

If the direction of the reflecting mirror 91 is adjusted as described above, the phase difference sensor 13 can measure the distance in the right-and-left direction or the horizontal direction using the reflection property of the mirror 91. In this case, center-point distance measurement for at least two points is performed using the central points of the photodetectors 13a and 13b of the sensor 13.

The process performed after the distance measurement is the same as that in the first embodiment. Specifically, the inclination of a projected image is computed on the basis of distance measurement data of measurement points in the vertical and horizontal directions, which are obtained by the phase difference sensor 13, and the distortion of the projected image is corrected in accordance with the inclination.

Though the direction of the reflecting mirror 91 has to be adjusted, the one phase difference sensor 13 can measure the distances to a target object in both the vertical and horizontal directions as in the first embodiment.

According to the present invention described above, a single phase difference sensor measures the distances in both vertical and horizontal directions. The components of the sensor can be reduced and the costs thereof can be lowered. The problem that the use of two phase difference sensors causes a difference in shape between the sensors can be resolved, and the precision of distance measurement can be prevented from decreasing.

When the phase difference sensor is longitudinally arranged and moved in the horizontal direction by a driving mechanism particularly as in the first embodiment, the distance to a target object in the horizontal direction can be measured using one point of the phase difference sensor (center-point distance measurement). The distance measurement can thus be performed correctly without being influenced by an error due to a change in shape with time.

Since the distance in the vertical direction is measured using different points of the phase difference sensor (multi-point distance measurement), the distance measurement is easily influenced by an error due to a change in shape with time. Since, however, the eyes of human beings are arranged in a right-and-left, direction, it is desirable to give higher priority to the distance measurement in the horizontal direction than that in the vertical direction. The structure for moving the phase difference sensor in the horizontal direction can be achieved more easily than that for moving it in the vertical direction.

In order to measure the distance in the vertical direction with higher precision according to the circumstances and conditions of measurement, the phase difference sensor can be arranged transversally and moved in the vertical direction.

Even though an optical member is provided on the front of a phase difference sensor and moved to change the direction of measurement of the sensor as in the second and third embodiments, the same advantages as those of the first embodiment can be obtained. Since the phase difference sensor can be fixed, it can be prevented from being displaced by, e.g., a shock and thus its measurement precision can be prevented from decreasing.

If a prism or a lens is used as the optical member as in the second embodiment, the direction of distance measurement can easily be controlled using the refraction property of the prism or lens.

If a reflecting mirror that is more inexpensive than the prism or lens is used as the optical member as in the second embodiment, the costs for the components can be lowered.

The first to third embodiments are directed to a projector. However, the present invention is not limited to the projector, but can be applied to all apparatuses necessary for distance measurement as well as an imaging device such as a digital camera. The same advantages as those of the first to third embodiments can be obtained from thee devices.

Figure 18:
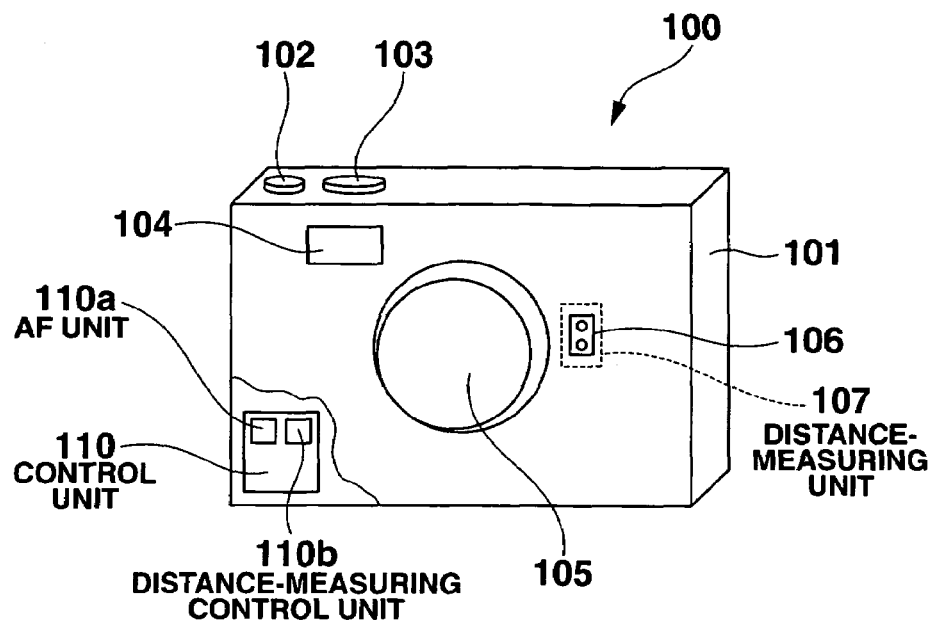
FIG. 18 is a sketch of a digital camera to which the distance-measuring apparatus of the present invention is applied.
Figure 19:
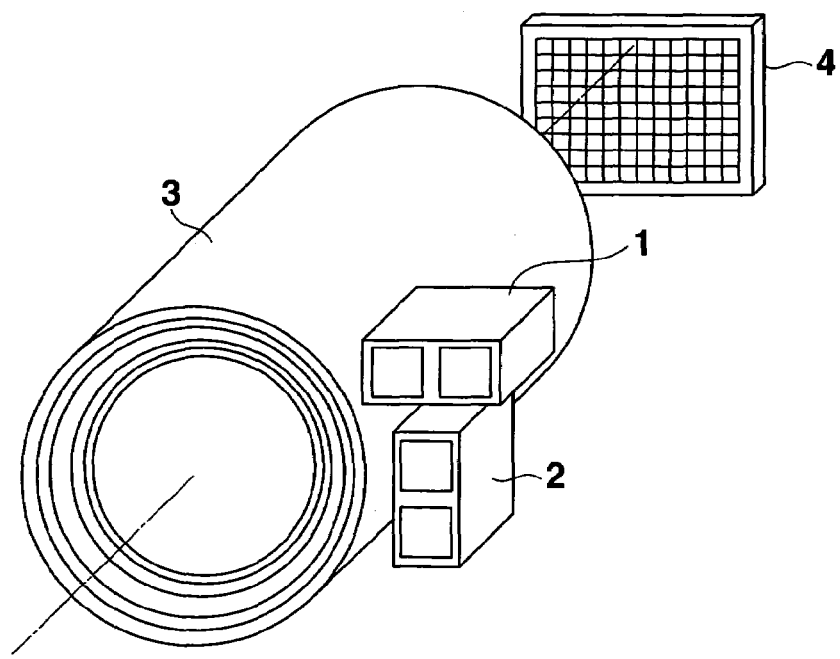
FIG. 19 is a sketch showing a relationship between a prior art projector and phase difference sensors.

FIG. 18 shows a digital camera to which the present invention is applied. In FIG. 18, reference numeral 100 indicates a small-sized digital camera. The camera 100 has a main body 101. Operation keys such as a power key 102 and a shutter key 103 are provided on the top of the main body 101. An optical finder window 104 and a shooting lens 105 are provided in front of the main body 101.

The main body 101 incorporates a control unit 110 of a microcomputer (CPU). The control unit 110 includes an automatic focusing (AF) unit 110a and a distance-measuring control unit 110b. The AF unit 110a automatically focuses light on a target object. Focus adjustment is called focus processing. The distance-measuring control unit 110b controls the distance-measuring operation of a distance-measuring unit 107 loaded in the digital camera 100.

A phase difference sensor 106 that is a component of the distance-measuring unit 107 is provided close to the shooting lens 105. The sensor 106 is arranged longitudinally and its measurement direction can be changed to the horizontal direction using any of the techniques of the first to third embodiments.

In the digital camera 100 so configured, the phase difference sensor 106 performs multi-point distance measurement for a target object in response to an instruction from the distance-measuring control unit 110b. The AF unit 110a performs focus processing on the basis of the distances to measurement points obtained as the results of the multi-point distance measurement.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An projecting apparatus comprising:
  a distance-measuring apparatus including:
    a phase difference sensor including a pair of light-receiving components arranged in line;
    a driving mechanism which supports the phase difference sensor such that the light-receiving components face a target object, and moves the phase difference sensor in a direction perpendicular to a direction of arrangement of the light-receiving components; and
    a distance-measuring unit which measures a distance to the target object in the direction of arrangement of the light-receiving components while the phase difference sensor is set in a given position and which moves the phase difference sensor through the driving mechanism to measure a distance to the target object in the direction perpendicular to a direction of arrangement of the light-receiving components;
  a distance-measuring control unit which controls a distance-measuring operation of the distance-measuring apparatus; and
  a trapezoid correcting unit which corrects a trapezoidal image projected on the target object based on the distances to the target object obtained from the distance-measuring apparatus in response to an instruction of the distance-measuring control unit.

2. The projecting apparatus according to claim 1, wherein the driving mechanism supports the phase difference sensor such that the light-receiving components are longitudinally arranged, and moves the phase difference sensor in a horizontal direction.

3. The projecting apparatus according to claim 2, wherein the distance-measuring unit measures at least two distances to the target object by multi-point distance measurement using points other than a central point of each of the light-receiving components, and moves the phase difference sensor through the driving mechanism to measure at least two distances to the target object by center-point distance measurement using the central point of each of the light-receiving components.

4. A projecting apparatus comprising:
  a distance-measuring apparatus including:
    a phase difference sensor including a pair of light-receiving components arranged in line;
    an optical member provided on a front of the phase difference sensor;
    a driving mechanism which supports the optical member such that the optical member faces a target object, and moves the optical member to change a direction of measurement of the phase difference sensor to a direction perpendicular to a direction of arrangement of the light-receiving components; and
    a distance-measuring unit which measures a distance to the target object in the direction of arrangement of the light-receiving components while the optical member is set in a given position and moves the optical member through the driving mechanism to measure a distance to the target object in the direction perpendicular to the direction of arrangement of the light-receiving components;
  a distance-measuring control unit which controls a distance-measuring operation of the distance-measuring apparatus; and
  a trapezoid correcting unit which corrects a trapezoidal image projected on the target object based on the distances to the target object obtained from the distance-measuring apparatus in response to an instruction of the distance-measuring control unit.

5. The projecting apparatus according to claim 4, wherein:
  the phase difference sensor is fixed such that the light-receiving components are arranged longitudinally; and
  the driving mechanism moves the optical member to change the direction of measurement of the phase difference sensor to a horizontal direction.

6. The projecting apparatus according to claim 5, wherein the distance-measuring unit measures at least two distances to the target object by multi-point distance measurement using points other than a central point of each of the light-receiving components, and moves the optical member through the driving mechanism to measure at least two distances to the target object by center-point distance measurement using the central point of each of the light-receiving components.

* * * * *